United States Patent
Karas et al.

(10) Patent No.: US 7,266,533 B2
(45) Date of Patent: Sep. 4, 2007

(54) ELECTRONIC GIFT GREETING

(75) Inventors: Peter M. Karas, Lakewood, CO (US); James E. Cowell, Littleton, CO (US); James R. Yoder, Chicago, IL (US); Matt F. Golub, Tera Fly, NJ (US); Aamer Ali Baig, Forest Hills, NY (US)

(73) Assignee: The Western Union Company, Englewood, CO (US)

( * ) Notice: Subject to any disclaimer, the term of this patent is extended or adjusted under 35 U.S.C. 154(b) by 450 days.

(21) Appl. No.: 10/010,068

(22) Filed: Dec. 6, 2001

(65) Prior Publication Data

US 2002/0138363 A1    Sep. 26, 2002

Related U.S. Application Data

(63) Continuation-in-part of application No. 09/737,912, filed on Dec. 15, 2000.

(60) Provisional application No. 60/256,127, filed on Dec. 15, 2000.

(51) Int. Cl.
*G06Q 30/00* (2006.01)
(52) U.S. Cl. .......................... 706/26; 705/27
(58) Field of Classification Search ............ 705/26–27
See application file for complete search history.

(56) References Cited

U.S. PATENT DOCUMENTS

| | | |
|---|---|---|
| 3,599,151 A | 8/1971 | Harr |
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |

(Continued)

FOREIGN PATENT DOCUMENTS

EP    0 481 135 A1    4/1992

(Continued)

OTHER PUBLICATIONS

Troy, Mike; "E-Greetings Break the Mold, Redefine the Industry," Discount Store News, Dec. 13, 1999, v38n23pg28, 3pgs, Proquest #47034059.*

(Continued)

*Primary Examiner*—Robert M. Pond
(74) *Attorney, Agent, or Firm*—Townsend and Townsend and Crew LLP

(57) ABSTRACT

According to the invention, a method for creating an electronic greeting card enclosing an electronic gift is disclosed. In one step, the electronic greeting card selection is received from a sender along with a selection of at least one of a type of electronic gift, an amount for the electronic gift, and an identifier for a receiver of the electronic gift. Payment for the electronic gift is received from a money handler chosen by the sender. A code indicative of the electronic gift is received, whereby the code facilitates redemption of the electronic gift. The code is embedded in the electronic greeting card.

28 Claims, 11 Drawing Sheets

U.S. PATENT DOCUMENTS

| | | | |
|---|---|---|---|
| 4,722,554 A | 2/1988 | Pettit | |
| 4,812,628 A | 3/1989 | Boston et al. | |
| 4,902,881 A | 2/1990 | Janku | |
| 4,961,142 A | 10/1990 | Elliott et al. | |
| 4,972,318 A | 11/1990 | Brown et al. | |
| 5,021,967 A | 6/1991 | Smith | |
| 5,053,607 A | 10/1991 | Carlson et al. | |
| 5,119,293 A | 6/1992 | Hammond | |
| 5,175,682 A | 12/1992 | Higashiyama et al. | |
| 5,220,501 A | 6/1993 | Lawlor et al. | |
| 5,283,829 A | 2/1994 | Anderson | |
| 5,350,906 A | 9/1994 | Brody et al. | |
| 5,367,452 A | 11/1994 | Gallery et al. | |
| 5,408,077 A | 4/1995 | Campo et al. | |
| 5,426,594 A | 6/1995 | Wright et al. | |
| 5,448,043 A | 9/1995 | Nakano et al. | |
| 5,461,217 A | 10/1995 | Claus | |
| 5,464,971 A | 11/1995 | Sutcliffe et al. | |
| 5,465,206 A | 11/1995 | Hilt et al. | |
| 5,477,037 A | 12/1995 | Berger | |
| 5,477,038 A | 12/1995 | Levine et al. | |
| 5,484,988 A | 1/1996 | Hills et al. | |
| 5,491,325 A | 2/1996 | Huang et al. | |
| 5,504,677 A | 4/1996 | Pollin | |
| 5,510,979 A | 4/1996 | Moderi et al. | |
| 5,513,117 A * | 4/1996 | Small | 700/233 |
| 5,524,073 A | 6/1996 | Stambler | |
| 5,555,496 A | 9/1996 | Tackbary et al. | |
| 5,570,465 A | 10/1996 | Tsakanikas | |
| 5,577,109 A | 11/1996 | Stimson et al. | |
| 5,604,802 A | 2/1997 | Holloway | |
| 5,622,388 A | 4/1997 | Alcordo | |
| 5,629,982 A | 5/1997 | Micali | |
| 5,638,283 A | 6/1997 | Herbert | |
| 5,649,117 A | 7/1997 | Landry | |
| 5,650,604 A * | 7/1997 | Marcous et al. | 235/379 |
| 5,657,201 A | 8/1997 | Kochis | |
| 5,677,955 A | 10/1997 | Doggett et al. | |
| 5,679,940 A | 10/1997 | Templeton et al. | |
| 5,699,528 A | 12/1997 | Hogan | |
| 5,717,868 A | 2/1998 | James | |
| 5,721,768 A | 2/1998 | Stimson et al. | |
| 5,732,136 A | 3/1998 | Murphree et al. | |
| 5,732,400 A | 3/1998 | Mandler et al. | |
| 5,745,886 A | 4/1998 | Rosen | |
| 5,757,917 A | 5/1998 | Rose et al. | |
| 5,764,888 A | 6/1998 | Bolan et al. | |
| 5,774,879 A | 6/1998 | Custy et al. | |
| 5,778,067 A | 7/1998 | Jones et al. | |
| 5,779,379 A | 7/1998 | Mason et al. | |
| 5,783,808 A | 7/1998 | Josephson | |
| 5,787,403 A | 7/1998 | Randle | |
| 5,790,793 A | 8/1998 | Higley | |
| 5,794,207 A | 8/1998 | Walker et al. | |
| 5,815,657 A | 9/1998 | Williams et al. | |
| 5,825,617 A | 10/1998 | Kochis et al. | |
| 5,826,241 A | 10/1998 | Stein et al. | |
| 5,828,875 A | 10/1998 | Halvarsson et al. | |
| 5,832,463 A | 11/1998 | Funk | |
| 5,870,718 A | 2/1999 | Spector | |
| 5,875,435 A | 2/1999 | Brown | |
| 5,878,211 A | 3/1999 | Delagrange et al. | |
| 5,880,446 A | 3/1999 | Mori et al. | |
| 5,893,080 A | 4/1999 | McGurl et al. | |
| 5,896,298 A | 4/1999 | Richter | |
| 5,897,625 A | 4/1999 | Gustin et al. | |
| 5,897,989 A | 4/1999 | Beecham | |
| 5,898,154 A | 4/1999 | Rosen | |
| 5,899,980 A | 5/1999 | Wilf et al. | |
| 5,899,982 A | 5/1999 | Randle | |
| 5,902,983 A | 5/1999 | Crevelt et al. | |
| 5,903,881 A | 5/1999 | Schrader et al. | |
| 5,909,492 A | 6/1999 | Payne et al. | |
| 5,909,673 A | 6/1999 | Gregory | |
| 5,910,988 A | 6/1999 | Ballard | |
| 5,913,202 A | 6/1999 | Motoyama | |
| 5,915,023 A | 6/1999 | Bernstein | |
| 5,920,629 A | 7/1999 | Rosen | |
| 5,920,847 A | 7/1999 | Kolling et al. | |
| 5,920,848 A | 7/1999 | Schutzer et al. | |
| 5,937,396 A | 8/1999 | Konya | |
| 5,949,044 A | 9/1999 | Walker et al. | |
| 5,952,639 A | 9/1999 | Ohki et al. | |
| 5,953,709 A | 9/1999 | Gilbert et al. | |
| 5,953,710 A | 9/1999 | Fleming | |
| 5,960,412 A | 9/1999 | Tackbary et al. | |
| 5,963,647 A | 10/1999 | Downing et al. | |
| 5,974,146 A | 10/1999 | Randle et al. | |
| 5,974,194 A | 10/1999 | Tackbary et al. | |
| RE36,365 E | 11/1999 | Levine et al. | |
| 5,987,426 A | 11/1999 | Goodwin, III | |
| 5,993,047 A | 11/1999 | Novogrod et al. | |
| 5,999,624 A | 12/1999 | Hopkins | |
| 6,003,763 A | 12/1999 | Gallagher et al. | |
| 6,011,833 A | 1/2000 | West | |
| 6,012,048 A | 1/2000 | Gustin et al. | |
| 6,015,087 A | 1/2000 | Seifert et al. | |
| 6,027,216 A | 2/2000 | Guyton | |
| 6,029,150 A | 2/2000 | Kravitz | |
| 6,030,000 A | 2/2000 | Diamond | |
| 6,032,133 A | 2/2000 | Hilt et al. | |
| 6,032,137 A | 2/2000 | Ballard | |
| 6,035,285 A | 3/2000 | Schlect et al. | |
| 6,035,406 A | 3/2000 | Moussa et al. | |
| 6,039,245 A | 3/2000 | Symonds et al. | |
| 6,039,250 A | 3/2000 | Ito et al. | |
| 6,044,360 A | 3/2000 | Picciallo | |
| 6,044,362 A | 3/2000 | Neely | |
| 6,045,039 A | 4/2000 | Stinson et al. | |
| 6,058,417 A | 5/2000 | Hess et al. | |
| 6,064,990 A | 5/2000 | Goldsmith | |
| 6,070,150 A | 5/2000 | Remington et al. | |
| 6,070,156 A | 5/2000 | Hartsell et al. | |
| 6,070,798 A | 6/2000 | Nethery | |
| 6,078,907 A | 6/2000 | Lamm | |
| 6,081,790 A | 6/2000 | Rosen | |
| 6,088,683 A | 7/2000 | Jalili | |
| 6,088,684 A | 7/2000 | Custy et al. | |
| 6,097,834 A | 8/2000 | Krouse et al. | |
| 6,098,053 A | 8/2000 | Slater | |
| 6,106,020 A | 8/2000 | Leef et al. | |
| 6,119,106 A | 9/2000 | Mersky et al. | |
| 6,119,931 A | 9/2000 | Novogrod | |
| 6,122,625 A | 9/2000 | Rosen | |
| 6,128,603 A | 10/2000 | Dent et al. | |
| 6,134,561 A | 10/2000 | Brandien et al. | |
| 6,145,738 A | 11/2000 | Stinson et al. | |
| 6,148,377 A | 11/2000 | Carter et al. | |
| 6,149,056 A | 11/2000 | Stinson et al. | |
| 6,164,528 A | 12/2000 | Hills et al. | |
| 6,167,386 A | 12/2000 | Brown | |
| 6,175,823 B1 * | 1/2001 | Van Dusen | 705/26 |
| 6,189,787 B1 | 2/2001 | Dorf | |
| 6,193,152 B1 | 2/2001 | Fernando et al. | |
| 6,193,155 B1 * | 2/2001 | Walker et al. | 235/381 |
| 6,199,761 B1 | 3/2001 | Drexler | |
| 6,202,054 B1 | 3/2001 | Lawlor et al. | |
| 6,206,283 B1 | 3/2001 | Bansal et al. | |
| RE37,122 E | 4/2001 | Levine et al. | |
| 6,223,168 B1 | 4/2001 | McGurl et al. | |
| 6,246,996 B1 | 6/2001 | Stein et al. | |
| 6,247,047 B1 | 6/2001 | Wolff | |
| 6,260,024 B1 | 7/2001 | Shkedy | |
| 6,263,446 B1 | 7/2001 | Kausik et al. | |

| | | |
|---|---|---|
| 6,269,369 B1 | 7/2001 | Robertson |
| 6,275,829 B1 | 8/2001 | Angiulo et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,987 B1 | 11/2001 | McCall et al. |
| 6,327,570 B1 | 12/2001 | Stevens |
| 6,327,575 B1 | 12/2001 | Katz |
| 6,343,279 B1 | 1/2002 | Bissonette et al. |
| 6,347,305 B1 | 2/2002 | Watkins |
| 6,360,254 B1 | 3/2002 | Linden et al. |
| 6,367,693 B1 | 4/2002 | Novogrod |
| 6,370,514 B1 * | 4/2002 | Messner ............ 705/14 |
| 6,394,343 B1 | 5/2002 | Berg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass |
| 6,449,599 B1 | 9/2002 | Payne et al. |
| 6,453,300 B2 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,747 B1 | 1/2003 | Stoutenburg et al. |
| 6,510,453 B1 | 1/2003 | Apfel et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B2 | 5/2004 | Cooper et al. |
| 6,761,309 B2 | 7/2004 | Stoutenburg et al. |
| 6,761,311 B1 | 7/2004 | Algiene et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,847,947 B1 | 1/2005 | Kambour et al. |
| 6,886,742 B2 | 5/2005 | Stoutenburg et al. |
| 6,908,031 B2 | 6/2005 | Seifert et al. |
| 6,922,673 B2 | 7/2005 | Karas et al. |
| 2001/0042785 A1 | 11/2001 | Walker et al. |
| 2001/0051876 A1 | 12/2001 | Seigel et al. |
| 2001/0054003 A1 | 12/2001 | Chien et al. |
| 2002/0023055 A1 | 2/2002 | Antognini et al. |
| 2002/0046106 A1 | 4/2002 | Ishibashi et al. |
| 2002/0062285 A1 | 5/2002 | Amann |
| 2002/0087462 A1 | 7/2002 | Stoutenburg et al. |
| 2002/0087463 A1 | 7/2002 | Fitzgerald et al. |
| 2002/0087467 A1 | 7/2002 | Muscavage et al. |
| 2002/0104026 A1 | 8/2002 | Barra et al. |
| 2002/0111908 A1 | 8/2002 | Milberger et al. |
| 2002/0138363 A1 | 9/2002 | Karas at el. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2003/0024979 A1 | 2/2003 | Hansen et al. |
| 2003/0028491 A1 | 2/2003 | Cooper |
| 2003/0055780 A1 | 3/2003 | Hansen et al. |
| 2003/0069856 A1 | 4/2003 | Seifert et al. |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0015438 A1 | 1/2004 | Compiano |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0088248 A1 | 5/2004 | Cutler |
| 2004/0088261 A1 | 5/2004 | Moore et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Muscavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0167860 A1 | 8/2004 | Baxter et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene et al. |
| 2005/0017067 A1 | 1/2005 | Weinberger |
| 2005/0167481 A1 | 8/2005 | Hansen et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |

FOREIGN PATENT DOCUMENTS

| | | |
|---|---|---|
| EP | 0 745 961 A2 | 4/1996 |
| EP | 0 745 961 A3 | 7/1998 |
| EP | 0 949 596 A2 | 10/1999 |
| EP | 1 077 436 A2 | 2/2001 |
| FR | 2728983 A1 | 7/1996 |
| WO | WO96/26508 | 8/1996 |
| WO | WO98/49644 A1 | 11/1998 |
| WO | WO98/50875 A2 | 11/1998 |
| WO | WO99/22291 A1 | 5/1999 |
| WO | WO99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/70517 A2 | 11/2000 |
| WO | WO 00/79452 A2 | 12/2000 |
| WO | WO 01/04816 A1 | 1/2001 |
| WO | WO 01/39093 A1 | 5/2001 |
| WO | WO 02/05195 A1 | 1/2002 |
| WO | WO 02/48839 A2 | 6/2002 |

OTHER PUBLICATIONS

M2 Presswire; Excite@Home to Acquire Bluemountain.com, Oct. 25, 1999, Proquest #45840472.*

BW: "Flashcards.com Launches with Dynamic New Form of Cutting-edge Online Greeting Cards & Invitations," Jul. 24, 2000, 2pgs, Proquest #56779853.*

Kolor, Joanna; "A new era of ATMs breeds much more than cash," Bank Technology News, Oct. 1996, v9i10pg1, Proquest #10338982, 5pgs.*

Bank Network News; "ATMs give wire transfers a run for the money," Jan. 28, 1998, v16i17pg4, Proquest #25876250, 3pgs.*

Redman, Russell; "Western Union, EDS plan cash transfers via ATMs," Bank Systems & Technology, Aug. 1998, v35i8pg19, Proquest #32279491, 3pgs.*

BNN: "Banks turn to debit to drive funds transfer," Bank Network News, v18n20, Mar. 16, 2000, Dialog file 9, #02109112, 5pgs.*

Business Wire, "*E-Commerce, Email and E-greeting Cards Combine in News WEb Site Deigned by Interactive Bureau*", Sep. 14, 1999 (abstract),[online] [retrieved on May 1, 2002], retrieved from PROQUEST Database, 2 pages.

PR Newswire, "*GiftSpot.com Simplifies Gift-Giving on the Internet*", Oct. 20, 1999 (abstract), [online] [retrieved on May 1, 2002], retrieved from PROQUEST Database, 5 pages.

Confinity, Inc., *PayPal.com, How PayPal.com Works*, downloaded from website http://www.paypal.com/ on Feb. 7, 2000.

Idealab Company, *PayMe.com*, downloaded from website https://ssl.idealab.com/ on Feb. 16 2000.

Intell-A-Check Corp.: "Intell-A-Check! - The Way to get Paid", Intell-A-Check product overview, retrieved from http://www.icheck.com/ on Feb. 7, 2000, 7 pages.

Karpinski, R. "Web Merchants Try Debit Cards and Gift Certificates to Spur Sales" InternetWeek, Oct. 11, 1999, 2 pages.

Lawton, George; "Biometerics: A New Era in Security"; 1998, Computer, vol. 31, No. 8, pp. 16-18.

New commerical services from Western Union allow businesses to directly transfer money internationally; User companies can now send or receive money at their own offices through on-line connection to world's largest international money transfer network. Business Wire. Oct. 16, 1995, p. 1.

Russo, R. "Omaha's Giftpoint.com Draws $5 Million Investment", Omaha World, Dec. 14, 1999, 2 pages.

Stockel, Anna; "Securing Data and Financial Transactions"; 1995, Institute of Electrical and Electronics Engineers 29th Annual Conference, pp. 397-401.

PR Newswire, "GiftSpot.com Simplifies Gift-Giving on the Internet," Oct. 20, 1999 (abstract), [online] [retrieved on May 1, 2002], retrieved from PROQUEST Database, 5 pages.

TeleCheck International, Inc.: "Making Checks Our Responsibility", retrieved from http://www.telecheck.com/home/home.html on Feb. 7, 2000, 8 pages.

Transpoint, "The Way to Pay Online", downloaded from website http://www.transpoint.com/ on Feb. 10, 2000, 12 pages.

Walker, L. "Click a Card", The Washington Post, Dec. 16, 1999, 3 pages.

Website "eCount" at http://www.ecount.com.

Website: "Billpoint" at http://www.billpoint.com.

Website: "eMoneyMail" http://www.emoneymail.com.

Website: "I-Escrow" at http://www.iescrow.com.

Website:"PayMe.com" at http://www.payme.com.

Website: "PayMyBills.com" at http://www/paymybills.com.

"You're sending more than a payment: You're sending peace of mind"; 2004, 3 pages.

"SBC Communications adds Western Union Locations for Walk-in Customer Bill Payments"; SBC News Release, 2 pages.

"Send Your Utility Bill Payment from Here!"; 3 pages.

"Rhode Island becomes first state to accept child support payments at Western Union: More than 50 Western Union Convenience Pay Agent Locations Offer New Level of Convenience to Rhode Island Residents Who Pay Child Support—"; 2002, 3 pages.

"Rhode Island becomes first state to accept child support payments at Western Union: Government Payment Leader govONE Solutions Adds Walk-in to Full Suite of Payment Options"; 2002, 3 pages.

"State of Hawaii to Accept Child Support Payments at Western Union"; 2004, 2 pages.

"Annual Report to the President of the Western Union Telegraph Company"; 1873, pp. 8-11.

"First located example of a money transfer"; Aug. 25, 1873, 1 page.

"Annual Report of the President of the Western Union Telegraph Company"; 1874, pp. 8-11.

"The Western Union Telegraph Company: Rules for Money Transfer Service"; 1908, pp. 3-25.

"The Western Union Telegraph Company: Delivery Department Instructions"; 1926, Commerical Bulletin No. 9-A, 2 pages.

"The Western Union Telegraph Company:Instructions for Receiving Clerks"; 1929, Commerical Bulletin No. 37-A, 2 pages.

"Annual Report of the Western Union Telegraph Company"; 1935, 2 pages.

"Dots and Dashes"; 1935, vol. 11, No. 9, 4 pages.

"Annual Report of the Western Union Telegraph Company"; 1940, pp. 9 and 22.

"Annual Report of the Western Union Telegraph Company"; 1947, 2 pages.

"Amex aims expansion strategy at local currency exchanges"; 1990, Crain's Chicago Business, 1 page.

"Sending Cash in a Flash"; 1990, Travel & Leisure, p. 42.

". . . And a Nine-Second Money Order Dispenser"; 1991, Post-News, vol. 17, No. 1, 1 page.

"Money-wire giants battle for business: Currency exchanges wooed"; 1991, Chicago Sun Times, 2 pages.

"Sending Cash in a Flash: There are more ways to do it than you might think"; 1991, 2 pages.

"Loved one stranded! Send-Cash"; 1991, Akron Beacon Journal, 2 pages.

"Common Values: Uncommon Opportunities"; 1995, First Data Corporation Annual Report, 2 pages.

"Behind the Scenes of Life"; 1996, First Data Corporation Annual Report, 3 pages.

"First Data InfoSource Offers Database Analysis with DecisionScope"; 1996, First Data Corporation News Release, 2 pages.

First Data and Netscape Offering Internet Payment Processing Service; 1996, First Data Corporation News Release, 3 pages.

"CES/NaBANCO Introduces Stored Value Card Technology: Blockbuster Video is First Merchant Partner"; 1996, First Data Corporation News Release, 3 pages.

"First Data to Offer Card Profitability Software from HNC: Distribution Agreement Poised to Repeat Falcon Success"; 1996, HNC Software, Inc. News Release, 3 pages.

"VIPS Introduces MCSource to Managed Healthcare Industry"; 1996, VIPS Healthcare Information Systems News Release, 2 pages.

"Leading Provider of Transaction Card Processing Selects Connect Oneserver Software as a Solution for Advanced Interent Merchant Services: First Data Chooses OneServer as an Application to Deliver the Internet to Banks and Merchants"; 1996, press Release, 4 pages.

"Netscape Announces Netscape Livepayment to Facilitate Internet Commerce"; 1996, Netscape News Release, 4 pages.

"Strean, LitleNet, BBN, and KPMG Announce Industry-Wide Initiative to Enable Wide-Scale Software Electronic Commerce"; 1996, News Release, 6 pages.

"First Data and Netscape Announce Program to Help Businesses Establish Payment-Enabled Web Sites"; 1996, First Data Corporation News Release, 5 pages.

"FDR to Offer HNC Software's Real-Time Fraud Detection: New distribution Agreement to Benefit Card Banks"; 1996, First Data Resources News Release, 3 pages.

"First Data Aligns with CyberCash to Offer New Electronic Coin Service"; 1996, First Data Corporation News Release, 3 pages.

"First Data, First USA Paymentech, GE Capital Invest in First Virtual Holdings"; 1996, First Virtual Holdings Corporation News Release, 3 pages.

"Annual Report of First Data Corporation"; 1998, 3 pages.

"Annual Report of First Data Corporation"; 1999, 2 pages.

"American Express Introduces Automated Money Order Dispenser"; 1991, Professional Check Casher, 1 page.

"Western Union Payment Services, Bidpay and Quick Collect, Online Bill Payment, Online Auction Payments"; http://www.westernunion.com/info/osComparePayment.asp, 2 pages.

"About Western Union: Company History"; http://www.payment-solutions.com/history.html, 2 pages.
"Western Union Money Transfer Services, Send Money Online, Money Orders, Send Telegrams"; http://www.westernunion.com/info/osCompareMoneyMessage.asp, 2 pages.
"Quick Pay: The Convenient and reliable way to receive payments from customers worldwide"; http://www.payment-solutions.com/quickpay.html, 3 pages.
Quick Cash: A safe and reliable way to send funds around the world; http://www.payment-solutions.com/quickcash.html, 1 page.
"Signature Services: Helping financial institutions send funds faster"; http://www.payment-solutions.com/signature.html, 1 page.
"American Express Money Orders, Travelers Cheques Now on Sale"; 1936, Dots and Dashes, 2 pages.
List of Prepaid Services; http://www.westernunion.com/info/osComparePrePaid.asp, 1 page.
"Get your Collect Card"; 1939, Dots and Dashes, 2 pages.
Picture of Bill payment form or advertisement, 1 page.
"NTS Completes Merger with EDS Fleet Services; New First Data Unit Sets Sights on New Markets"; 1996, NTS Press Release, 3 pages.
Transfers require ID made by telephaph; 1895, Tariff Book, 4 pages.
American Greeting Cards Click-Through; 38 pages.
"MoneyZap.com Greeting Card Process Flow"; 2000, 2 pages.
"Western Union/Money Zap: Send and receive money easily over the internet"; http://www.moneyzap.com/main.asp, 23 pages.
"Western Union Gift Greetings"; 6 pages.
"PayPal: The way to send and recieve money online"; 4 pages.
"Aeromexico and Western Union Partner to Offer a Cash Payment Option for Booking Airline Tickets"; 2004, Press Release, 2 pages.
"Western Union and Continental Airlines Introduce New Quick and Easy Cash Payment Option When Booking Flights"; 2004, Press Release, 4 pages.
"Purchasing American Airlines Tickets Just Got Easier"; 2004, Press Release, 4 pages.
"LAN Airline Alliance Carriers and Western Union offer Travellers Additional Payment Options"; 2005, Press Release, 3 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Federal Benefits Checks are Going Away-Don't Let Your Customers Go with Them: Announcing the Western Union Benefits Quick Cash Program"; 4 pages.
"Introducing the Western Union Cash Card Program"; 1998, 2 pages.
"Western Union Creates Phone Card with BLT Technologies"; 1997, PR Newswire Association, 2 pages.
"AT&T Wireless to Offer Western Union SwiftPay as Replenishment Option for AT&T Free2Go Wireless Prepaid Customers"; 2001, PR Newswire Association, 2 pages.
"New Western Union SwiftPay Service Continues Expansion of Consumer-to-Business Payment Options"; 1999, PR Newswire Association, 2 pages.
"Western Union SwiftPay Selected by Sheakley Uniservice to Complete W-2 Reprint Transactions"; 2000, PR Newswire Association, 2 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment Options"; 2002, Press Release, 2 pages.
"SBC Communications Adds Western Union Locations for Walk-In Customer Bill Payments"; 2005, Press Release, 2 pages.
"Western Union Money Orders More Popular Than Ever": 1942, Dots and Dashes, vol. 18, No. 3, 2 pages.
"Refund of Money Transfers"; 1913, Journal of the Telegraph, 2 pages.
Western Union Credit Card; 1915, 4 pages.
How money by phone was paid;; Money Transfer Service: Book of Rules and List of Offices; 1926, Western Union Telegraph Company, 3 pages.
"Pilgrims Started Thanksgiving Custom"; Dots and Dashes, vol. 4, No. 11, 2 pages.
"The Yellow Blank is Correct for every social need"; 1930, Western Union Booklet, 2 pages.
"Last of the Pony Express Riders Tells His Story"; 1932, Dots and Dashes, vol. 8, No. 10, 2 pages.
"Nation Receives Time Over Western Union Network"; 1931, Dots and Dashes, vol. 7, No. 5, 2 pages.
"Collect your delinquent accounts by Telegraph"; 1933, Form 1229-A, 1 page.
"Reynolds Arcade was Western Union Birthplace"; 1933, Dots and Dashes, vol. 9, No. 8, 2 pages.
"Messenger Work Full of Adventure, Excitement"; 1933, Dots and Dashes, vol. 9, No. 11, 2 pages.
Shopping Order service and gift service; 1934, Western Union Telegraph Company, Money Order Book, 6 pages.
Money Orders by Phone; 1935, Fortune Magazine, 3 pages.
"The Yellow Blank: When, Why, How to Use It"; 1934, 5 pages.
Money Order with confirmation; 1948, 1 page.
"Western Union Products and Services: a brief description"; 1960, 22 pages.
Survey of services; 1960, pp. 2-31.
Western Union News Supplement: Automatic travelers checks using Western Union; 1975, 2 pages.
Western Union New Supplement: Money Orders delivery through Mailgram: 1975, 2 pages.
Candygram payment service, 1 page.
Remittance for order sent via Western Union; 1933, 2 pages.
Western Union Telegraph Company; 1933, Money Order Message.
Gift: Money Order for something you really want: 1933, 1 page.
Holiday Greetings by Western Union; 1933, 1 page.
Western Union Money Transfer, Form 72-A, 1933, 1 page.
Western Union Foreign Transfer Order, Form 72-A, 1933, 1 page.
Western Union Domestic Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Shopping Order by Western Union, 1933, 1 page.
Western Union Shopping Order, 1933, 2 pages.
Western Union Hotel-Motel Reservation Service, 1 page.
bidpay.com: Whois search results; 2003, http://www.networksolutions.com/en_US/whois/results.jhtml;jsessionid+VZDZVYDD1J, 2 pages.
"billserv.com Launches bills.com, an internet Portal for Consumers to Pay All Bills Online at No Cost"; 2000, Business Wire, 2 pages.
First Data Acquires PaySys International; 2001, Press Release, 2 pages.
Luxury Brands LLC: WOrld Famous Brands at Liquidation Proces; http://www.auctionbytes.com/cab/pages/payment, 3 pages.
PayPal for the Palm; http://handheldnews.com/file.asp?ObjectID=5401, 2 pages.
PayPal.com Case Study; http://fox.rollins.edu/~slackman/PayPal.htm, 2003, 7 pages.
PayPal-News; http://www.ndrys.com/paypal.html, 2003, 3 pages.
Hoffman, Karen Epper; "PayPal Still Running Free"; 2003, Bank Technology News, 3 pages.
Latour, Alamr; "PayPal Electronic Plan May be on the Money in Years to Come"; 1999, The Wall Street Journal, 2 pages.
Plotkin, Hal; "Beam Me up Some Cash"; 1999, Silicon Valley Insider, 3 pages.
Boneh, Dan: "Beaming Money by Email is Web's Next Killer App"; 1999, PR Newswire, 4 pages.
BidPay: Seller FAQs—Receiving Payments and Using the Money Order Service; 7 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.

Steiner, Ina: "PayPal Online Payement Service—Another Way to Pay for Auction Items"; 2000, Auction Bytes, 4 pages.
Steiner, Ina: "Accepting Credit Cards When You Sell Items: ProPay and Billpoint Payment Services"; 2000, Auction Bytes, 4 pages.
Wermer, Sandra; "A million credit card transactions in five hours"; 1997, Primeur, 2 pages.
"PaySys signs up four Asian distributors"; 1997 Orlando Business Journal, 3 pages.
Products and Services for PaySys, 2 pages.
VisionPLUS Consumer Payment Solution Overview, 2 pages.
PaySys—company overview, 2 pages.
State of New York Banking Department: Staff Letters and Memoranda; 2000, http://www.banking.state.ny.us/lo000718.htm, 2 pages.
Wijnen, Rene; You've Got Money!; 2000, Bank Technology News, vol. 13, No. 6, 4 pages.
"Western Union Quick Collect"; 2 pages, 2004.
"Why Send Your Customers Across Town When You Can Send Them Next Door?"; 2005, 1 page.
"There's a lot to be said about the many advantages of the Quick Collect service. And look who's saying it"; 4 pages, (date unknown).
"If you're not getting your payment with Quick Collect, chances are you're not getting it"; 2001, 2 pages.
"Western Union: Ford Credit Phone Pay-How does it work?", 2001, 1 page.
Western Union Quick Collect: The Fastest way to collect good funds; 1999, 11 pages.
"Only Western Union"; 2 pages, (date unknown).
"Announcing Quick Collect Online"; 2002, Western Union's Professional Collector, 3 pages.
"When you're helping a customer make a crucial payment there's no room for guesswork"; 2002, Western Union's Professional Collector, 3 pages.
"Western Union Quick Collect: The most agents, the most locations, the most experienced"; 2000, 2 pages.
"It takes a certain person to make a good collector. But it takes a good manager to make a champion"; 2001, Western Union's Professional Collector, 3 pages.
"Nationwide Credit Collectors Act Globally"; 2001, Western Union's Professional Collector, 3 pages.
"Guess What? The check's not in the mail"; 2001, Western Union's Professional Collector, 3 pages.
"Quick Cash and Quick Collect: Western Union's money-movers"; 1990, Newsbriefs, vol. 2, No. 1, 3 pages.
You're sending more than a payment: Point-of-Sale & Merchandising Support Advertising Materials, 2 pages, (date unknown).
"Company Profile: The Western Union Convenience Pay Service"; 2004, 4 pages.
Walker, L., "Click a Card," The Washington Post, Dec. 16, 1999, 3 pages.
Russo, E., "Omaha's Giftpoint.com Draws $5 Million Investment," Omaha World, Dec. 14, 1999, 2 pages.
Karpinski, R., "Web Merchants Try Debit Cards and Gift Certificates To Spur Sales," InternetWeek, Oct. 11, 1999, 2 pages.
"Annual Report of the Western Union Telegraph Company"; 1949, 2 pages.
"Annual Report of the Western Union Telegraph Company"; 1951, 2 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 2 pages.
"Annual Report of the Western Union Telegraph Company"; 1978, 2 pages.
"Annual Report of the Western Union Telegraph Company"; 1981, 2 pages.
"Amex Money Order Dispenser"; 1990, The Nilson Report, 1 page.
"Quick Cash and Quick Collect: Western Union's money-movers"; 1990, Newsbriefs, vol. 2, No. 1, 3 pages.
"Western Union's Would-Be Rival"; 1990, American Banker, 1 page.
"American Express In New Ad Drive"; 1990, American Banker, 1 page.
"American Express Unit Introduces State-Of-The Art Automated Money Order Dispenser"; 1990, Tri-State Food News, 1 page.
"Annual Report of the Western Union Corporation"; 1990, 4 pages.
"Collection by Money Transfer: MoneyGram Service Removes Time-Consuming Steps to Commerical Collections"; 1990, Collector, p. 36.
"Annex tests Moneygram"; 1990, Adnews, 1 page.
Amerinet, Inc., "Debit-It!—The Best Idea In Payment Systems Since the Credit Card", downloaded from website http://www.debit-it.com/ on Feb. 7, 2000, 8 pages.
Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com, (1999).
Confinity, Inc., PayPal.com, How PayPal.com Works, downloaded from website http://www.paypal.com on Feb. 7, 2000, 7 pages.
Dotbank, The Way to Send and Receive Money on the Internet, downloaded from website http://www.dotbank.com, Feb. 7, 2000, 6 pages.
http://www.vfi-finance.com/tranz330.htm, Tranz 330 Fast, Low-Cost Transaction Automation At The Point Of Service, VeriFone Finance, Jan. 1999, pp. 1-3, especially pp. 1-2.
Idealab Company, PatMe.com, downloaded from website http://ssl.idealab.com on Feb. 16, 2000, 7 pages.
Website: "PayPal" at http://www.paypal.com.
Website: "Tradesafe.com" at http://www.tradesafe.com.
x.com, Do More with Your Money, downloaded from website http://www.x.com., Feb. 7, 2000, 5 pages.
http://news.firstdata.com/media/ReleaseDetail.cfm?ReleaseID=849995>.
Press Release: "Western Union Announces ATM Card Payout for Money Transfer Transactions"; 2001, URL: http://news.firstdate.com/media/ReleaseDetail.cfm?ReleaseID=84995>.
Levin, Gary; "Western Union not fading into sunset; new services are added as telegrams drop"; 1992, 2 pages.
"Quick Collect"; Western Union Training Guide; 2004, 10 pages.
"Send your payment using Western Union Quick Collect"; 2 pages.
"Purchasing American Airlines Tickets Just Got Easier"; 2005, 4 pages.
"Lan Airline Alliance Carriers and Western Union Offer Travelers Additional Payment Options"; 2005, 3 pages.
Quick Collect: Government/Child Support Agency Name, Training Guide; 2004, 7 pages.
"Western Union Quick Collect; 3 Easy Ways to Send a Payment: In Person, Online or by Phone!"; 2 pages.
"Western Union: Now, using our service is even more rewarding"; 1 page.
"To send a Quick Collect Payment"; sample form, 1 page.
"Western Union: Some Quick Facts about Quick Collect"; 1 page.
"Quick Collect Sales Presentation"; 28 pages.
x.com, Do More with Your Money, downloaded from website http://www.x.com, (date unknown).

* cited by examiner

ELECTRONIC GIFT GREETING

This application claims the benefit of U.S. patent Ser. No. 09/737,912 and U.S. Provisional Patent Application No. 60/256,127, both filed on Dec. 15, 2000.

BACKGROUND OF THE INVENTION

This invention relates in general to greeting cards and, more specifically, to electronic greeting cards.

Electronic greeting cards (eCards) are analogous to paper greeting cards, but are available only on computers in electronic form. These eCards are available from web sites such as BlueMountain.com™. An eCard is usually sent by an e-mail message that invites the recipient to execute a program or applet that displays a greeting that could be animated or could include a personalized message.

With paper greeting cards, the sender may accompany the card with a gift commensurate with the occasion as is customary in some cultures. It is known to also include cash, a check or gift certificate along with the paper greeting card to serve as the gift. Electronic greeting cards provide no mechanism for including a gift with the card.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides an apparatus and method for embedding electronic gifts in electronic greeting cards (eCards). A sender of the eCard can select the electronic gift during the eCard creation process. The receiver redeems the electronic gift after receiving it in the card. Electronic gifts could include a credit in a stored value fund, a foreign currency credit in the stored value fund, a prepaid credit or debit card, a prepaid phone card, promotional points, airline mileage credits, a gift certificate for one or more retailers, and a separately delivered negotiable instrument. The prepaid credit or debit cards are backed by a credit card company and are usable like a credit card for purchases up to a specified amount. For example, a $50 MasterCard™ prepaid credit card could be issued that is good for any goods or services offered by a merchant that accepts MasterCard™ until the $50 credit is spent.

Figure 1:
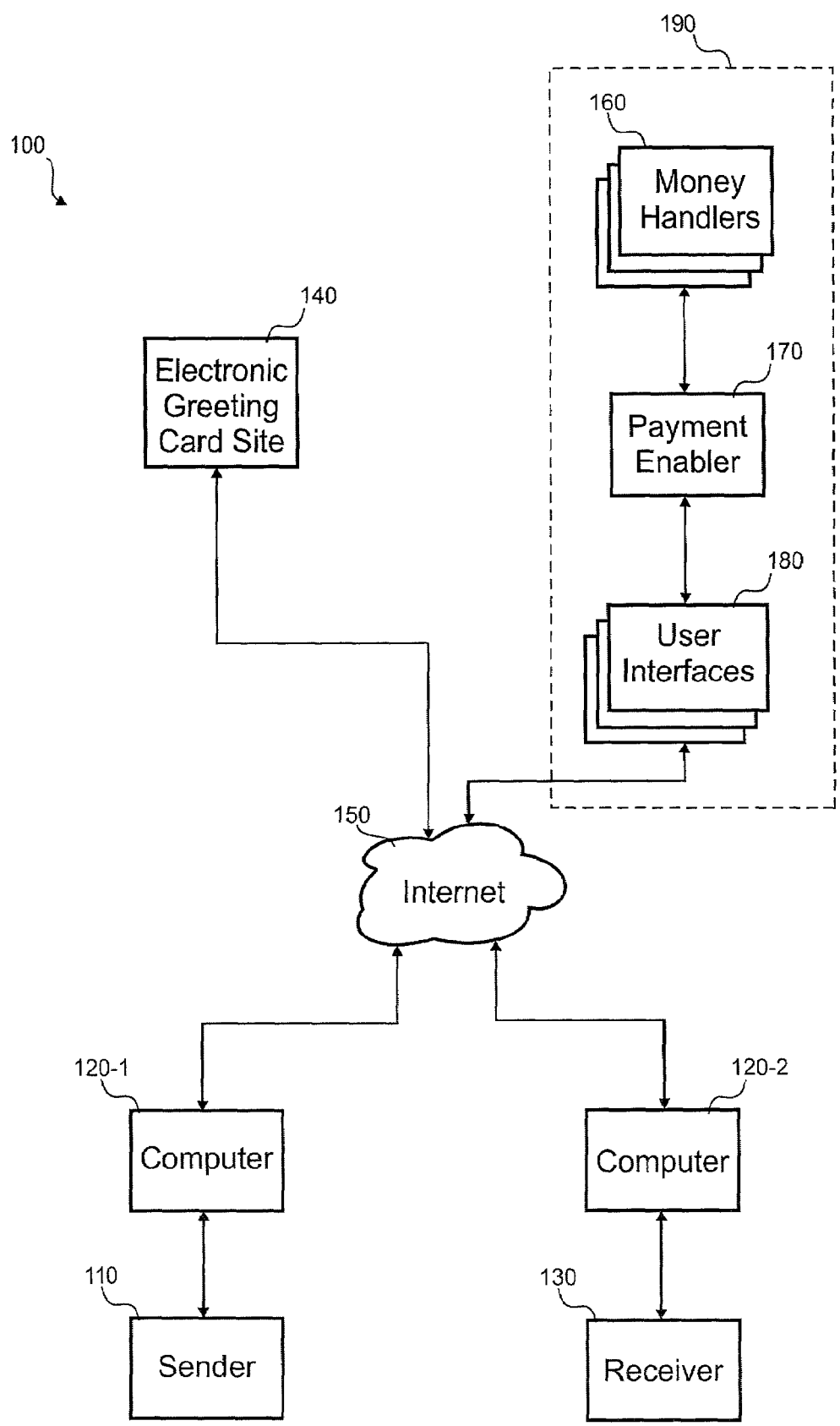
FIG. 1 is a block diagram of an embodiment of an on-line greeting and gift system.

Referring first to FIG. 1, a block diagram of an embodiment of an on-line greeting and gift system 100 is shown. Included in the system 100 are an eCard site 140, an online money transfer system 190, a sender 110, and a receiver 130. Respective computers 120 interface the sender 110 and receiver 130 to the Internet 150 or other wide area network such that they can interact with the eCard site 140 and the money transfer system 190. Money handlers 160, a payment enabler 170 and user interfaces 180 make up the money transfer system 190.

The eCard site 140 is a web site on the Internet 150 and may include servers and other computers as is well known in the art. The sender 110 points their browser to the eCard site 140 to choose an eCard to send to the receiver 130. Although this embodiment shows the eCard site 140 being separate from the money transfer system 190, other embodiments could combine these into the same location or spread portions among any number of locations.

The transfer system 190 works in concert with the eCard site 140 to provide the electronic gift for embedding in the eCard. Also, the receiver 130 may interact with the transfer system 190 to payout the electronic gift. In some cases, the sender 110 chooses a type of electronic gift that does not require the receiver 130 to interact with the transfer system 190, such as with a gift certificate. Money handlers 160 are used to payin money used for the electronic gift or payout gifts of money. The user interfaces 180 provide a variety of ways for the sender and receiver 110, 130 to interact with the transfer system 190.

Figure 2:
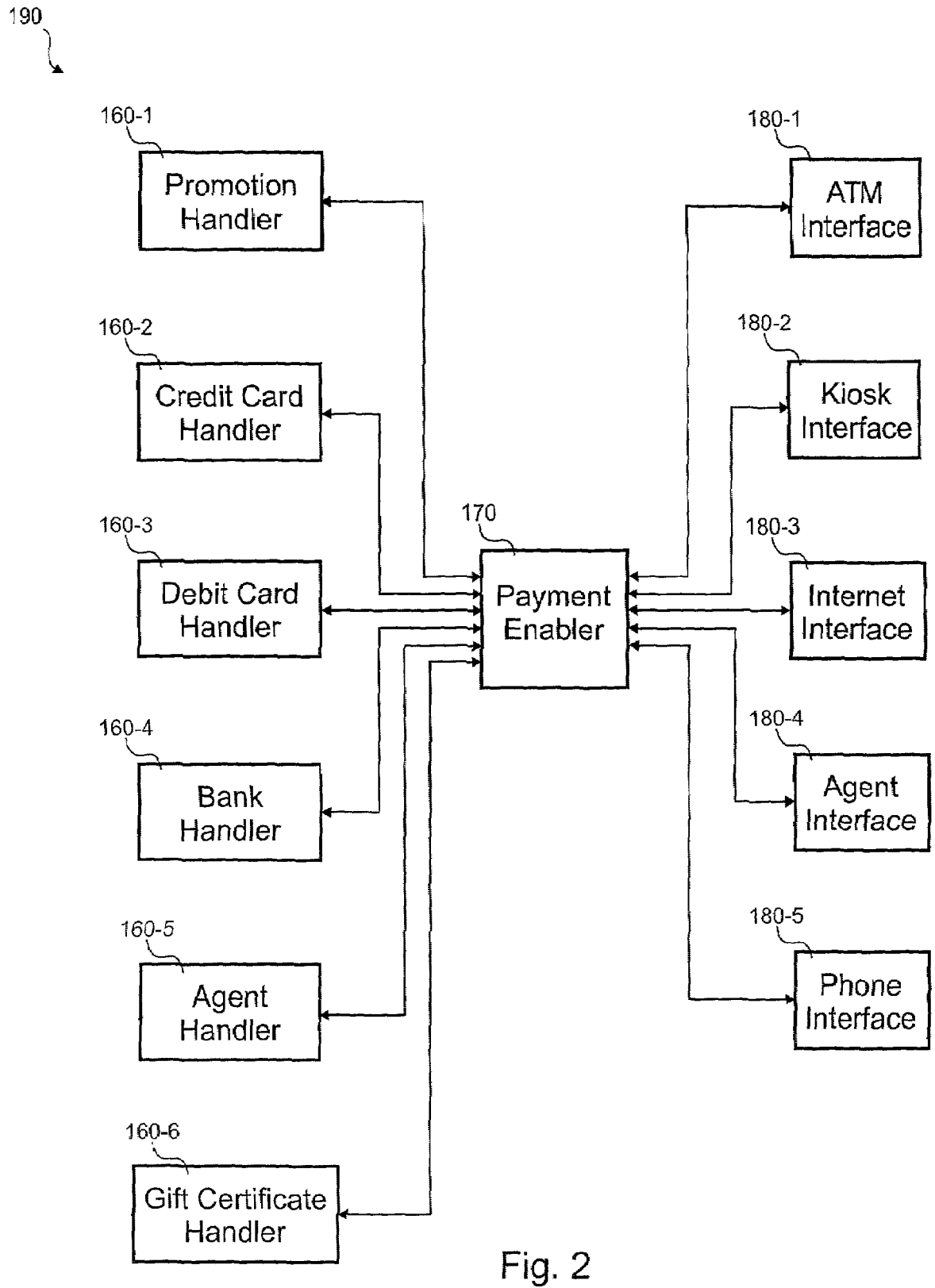
FIG. 2 is a block diagram of an embodiment of an online money transfer system.

With reference to FIG. 2, a block diagram of an embodiment of an online money transfer system 190 is shown. In this embodiment, six handlers 160 and five user interfaces 180 are shown. Other embodiments could have more or less handlers 160 and interfaces 180. Each of the handlers 160 allows a sender or receiver 110, 130 to add and/or remove money from the payment enabler 170. Normally, the receiver 130 can choose the handler 160, but in some circumstances, the sender 110 can choose the handler 160.

For example, the sender may specify a particular gift certificate handler 160-6 that only allows the certificate to be used at a particular store for merchandise and/or services. The user interfaces 180 allow interaction with the payment enabler 170 to transfer money to and from a stored value fund.

The promotion handler 160-1 allows adding and removing money in a form other than legal tender or negotiable instrument. Examples include airline mileage programs, prepaid phone cards. For example, a user could use money in their stored value fund to purchase airline miles with an airline mileage handler 160-1. A conversion rate would be applied to convert the money to mileage credit. The promotion handler 160-1 may need special information from the payment enabler 170, such as the user's promotion account number, etc. Some of the interfaces 180 used to gain access to the payment enabler 170 could be used to also gain access to the eCard site 140 to allow ordering a eCard with an embedded gift where a computer 120 may not be readily available to the sender 110.

The credit and debit card handlers 160-2, 160-3 behave largely the same. Both can be used to add money into the payment enabler 170. In other embodiments, these handlers 160-2, 160-3 can also be used to remove money from the payment enabler 170 also, for example, to purchase a prepaid credit/debit card, to pay down a balance on a credit card, or to add credit to a bank account associated with a debit card. To use these handlers 160-2, 160-3, the payment enabler 170 stores the information for receiving money from credit or debit cards in the conventional way, such as the account number, expiration date, name, and/or PIN. Similar information may be used when paying-out money to a credit/debit card.

The bank handler 160-4 allows electronic funds transfer (EFT) of money to a bank account of the user. The user enters the account number and routing information into the payment enabler 170 with a user interface 180 to facilitate adding and removing of money from the payment enabler with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as an agent interface 180-4 for interacting with the payment enabler 170. Some embodiments could wire money into a bank account of the user instead of an EFT.

The agent handler 160-5 typically corresponds to an agent location 500 that may wire money, print money orders and/or cash checks. Money may be sent to the agent handler 160-5, whereafter the user is issued cash or a negotiable instrument for that money. Money can be added to the system 100 by the agent handler 160-5 also. For example, the user may give cash to the agent who enters a credit into the payment enabler. The user could further specify to the agent a receiver who should get the money. An agent interface 180-4 at the agent location 500 is used by the agent to indicate to the payment enabler 170 that the money has been received from or by the user. Through an agent handler 160-5 a sender 110 could use the online money transfer system 100 without any knowledge of computers or without any debit/credit card or bank account.

Gift certificates are dispensed through one or more gift certificate handlers 160-6. The gift certificate can be limited to merchandise and/or services from a single store or a group of stores. In some cases, the gift certificate is used only online by entering a code provided to the receiver or could be printed for use in a bricks and mortar store. Cash equivalents such as Flooz™, formerly available from Flooz.com, could also be provided to the receiver 130.

As briefly discussed above, the ATM interface 180-1 allows interaction with the payment enabler 170. The user may 110, 130 or may not have an affiliation with the ATM that is used to interface with the payment enabler 170. Under this circumstance, the owner of the ATM may charge the user a fee for this service. The user 110, 130 can receive cash or deposit cash if the ATM is coupled to a bank handler 160-4. In any event, the ATM interface 180-1 can be used to interface with the payment enabler 170 in the same way a user 110, 130 may interact through a web browser and computer 120 with the payment enabler 170. If the ATM has a magnetic stripe or smart card reader, this could be used by to avoid entering credit or debit card information manually for the payment enabler 170.

A kiosk interface 180-2 allows a user to interact with the payment enabler 170, but typically does not allow adding or removing cash. The kiosk interface 180-2 may be a browser terminal available for general use. Some embodiments may include a check or money order printer for removing money from the system 100. The kiosk interface 180-2 could be in an agent location 500 and linked to the other systems in the agent location 500 such that a payout could be provided by other systems in the agent location 500.

An Internet interface 180-3 is typically implemented through a web browser. The browser downloads web pages from the payment enabler 170. The Internet interface could be hosted by the computer 120 of the user. Some embodiments could host the Internet interface on a portable device such as a wireless phone or personal digital assistant (PDA). The Internet interface 180-3 may also be used by the ATM, kiosk and agent interfaces 180-1, 180-2, 180-4 in whole or in part. The Internet interface 180-3 uses encryption for the link to the payment enabler 170 in some embodiments.

The agent interface 180-4 allows for specialized interaction by an agent at the agent location 500. Agents typically have special training and offer enhanced services over most interfaces 180 and handlers 160. The agent can move money between senders 110 and receivers 130 at the direction of the user. Also, the agent can pay-in and pay-out money from the transfer system 100. The agent interface 180-4 allows an agent to act on behalf of the user when manipulating the user's account. For security, the user's password or PIN may be entered during this manipulation. Further, the agent may verify the identity of the receiver 130 before disbursing the electronic gift. In one embodiment, a test question is provided by the sender 110 that the receiver 130 must answer before the electronic gift is paid-out.

Interaction with the payment enabler 170 may also be performed over a telephone 140 interfaced to the plain-old telephone system (POTS) 155. The phone interface 180-5 provides voice prompts and recognizes the user's touch-tone or speech recognized input. Enhanced interaction with the phone interface 180-5 could be provided with wireless phones having wireless access protocol (WAP) and/or browser graphical user interfaces (GUIs).

Figure 3:
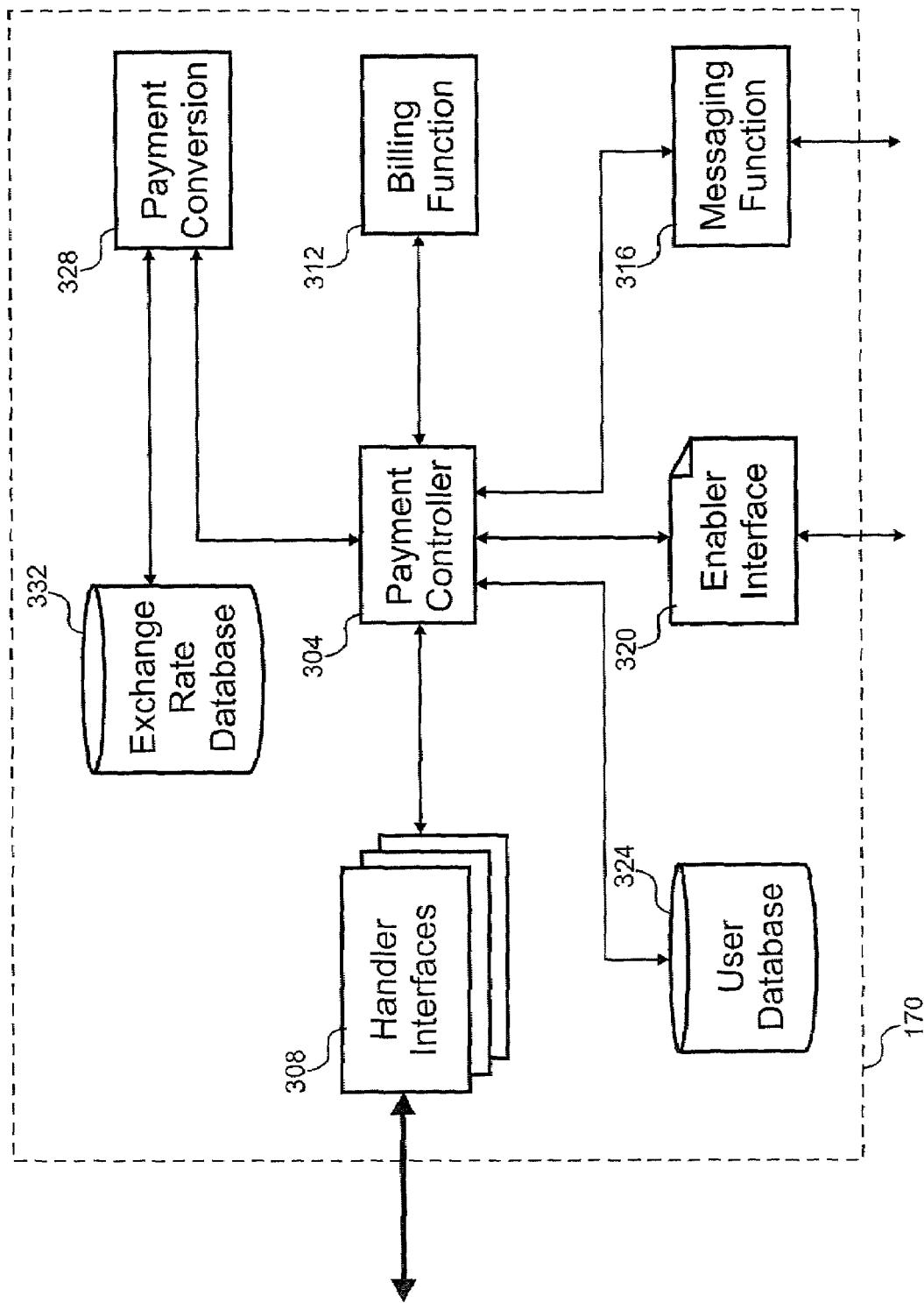
FIG. 3 is a block diagram of an embodiment of a payment enabler.

Referring to FIG. 3, a block diagram of an embodiment of a payment enabler 170 is shown. The transfer of money between handlers 160, stored value funds and users 110, 130 is controlled by the payment enabler 170. The payment enabler 170 may be implemented on one or more computers in one or more locations where the various computers communicate over a network. Included in the payment enabler 170 are a payment controller 304, handler interfaces 308, a billing function 312, a messaging function 316, an enabler interface 320, a user database 324, a payment conversion function 328, and an exchange rate database 332.

The payment controller 304 manages operation of the payment enabler 170. The handlers 160 and interfaces 180 along with user information and money conversion tasks are all choreographed by the payment controller 304. The payment controller 304 is interconnected to the other portions of the payment enabler 170 by one or more networks.

The payment conversion function 328 allows converting between disparate forms of money as it is transferred through the transfer system 190. An exchange rate database 332 holds conversion factors that allow determining the proper weight to give one form of money with respect to the others. In one example, the payment conversion function 328 may convert money in U.S. dollars to money in European Union Euros. In another example, a user may convert money into airline miles of eight miles for every dollar for a promotion handler 160-1. The exchange rate database 332 is updated with conversion rates as often as practical using conventional methods. The conversion rate may accommodate a percentage service fee for the exchange, or instead of a conversion rate, a flat fee could be charged.

A billing function 312 monitors and charges for the services of the payment enabler 170. There may be charges when transferring money, converting money, sending electronic gifts, printing and mailing negotiable instruments, using kiosks, ATMs or agent locations, etc. These charges are normally deducted from a transfer, but other embodiments could charge monthly fees. Some embodiments could recover a fee from the handler 160, for example, a fee could be charged to the gift certificate target store instead of charging the sender 110. The different types of handlers 160 may have different fees associated with them. For example, a credit card may have a three percent charge, but a bank transfer may only have a one percent charge. The sender and/or the receiver can be charged to transfer money between themselves. The transfer in or out of the system 100 may incur a separate charge. The billing function 312 may issue invoices for some users.

There are handler interfaces 308 to support the various handlers 160. Each of these interfaces 308 may support a single handler 160 or a group of handlers. For example, a single interface may perform EFT both to and from all bank handlers 160. When money is sent to or received from a handler 160, the appropriate handler interface 308 passes the money and transfer information to the payment controller. In some embodiments, the cost of the transfer to or from the handler is reported by the handler interface 308 such that the billing function can recover those costs.

Information for the users of the system 100 is stored in the user database 324. This information includes an address book of other users, money credit in the stored value fund, past money transfer information, account number, e-mail addresses, contact information, handler interface information, handler preference information, etc. The money credit is stored in a trust account for the benefit of the user according to the entry in the user database 324 corresponding to that user and interest may or may not be paid on that money credit.

The enabler interface 320 is used by the various interfaces 180 to interact with the user. The enabler interface 320 produces the form web pages and informational web pages to allow the user to create and maintain their account, transfer money, select electronic gifts, and learn to use the system 100. The appropriate user interface 180 formats and processes the enabler interface information according to the device used to interface with the payment enabler 170. For example, the Internet interface 180-3 takes the information from the enabler interface 320 and formats into hypertext mark-up language (HTML) appropriate for the computer 120 of the user.

A messaging function 316 is used with some configurations to notify the user of certain events. Requests for money are sent by the messaging function 316 along with acknowledgment and billing messages. These messages could be accessed using a web browser, an e-mail program, an instant messaging program, a pager, a WAP enabled device, etc. In some embodiments, the messaging function 316 may issue printed bills for users. The messaging function 316 is also used to communicate with agent locations 500 and with the eCard site 140.

Figure 4:
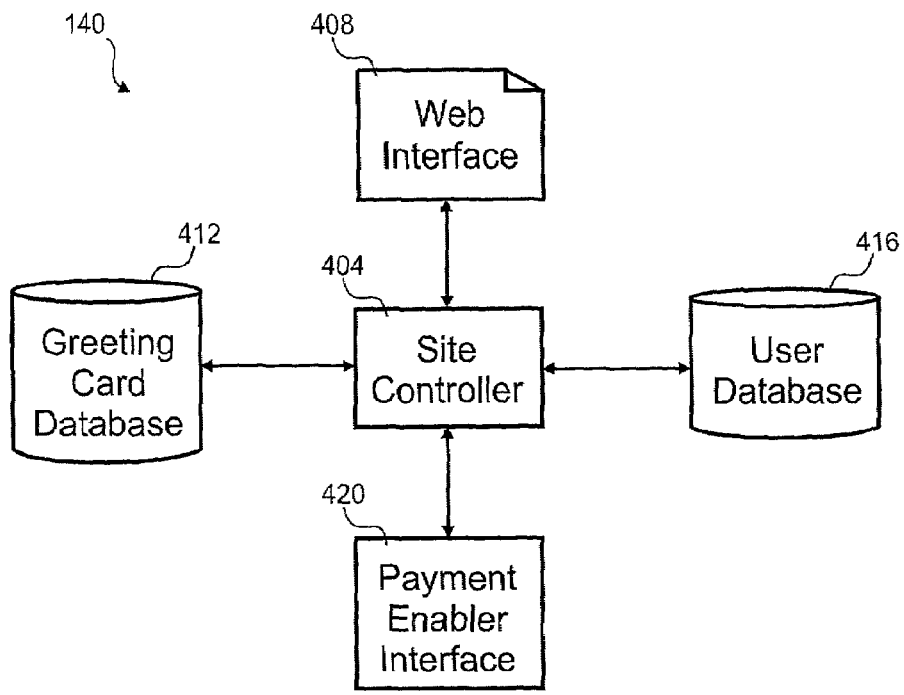
FIG. 4 is a block diagram of an embodiment of an electronic greeting card site.

With reference to FIG. 4, a block diagram of an embodiment of an eCard site 140 is shown. The eCard site 140 works in concert with the money transfer system 190 to allow embedding electronic gifts for those senders wishing to include a gift with the eCard. The eCard site includes a site controller 404, a web interface 408, a user database 416, a greeting card database 412, and a payment enabler interface 420.

The site controller 404 manages the functions of the eCard site 140. The web interface 408 allows interaction with information in the greeting card database 412 and user database 416. Both the sender and receiver 110, 130 interact with the web interface 408 to either send or receive the eCard. The possible eCards the sender might select are stored in the greeting card database 412. Any account information on the sender and receiver 110, 130 is stored in the user database 416. The user database 416 also stores the chosen eCard with any customizations for the benefit of the receiver 130. When the receiver provides the e-mailed code to the web interface 408, the eCard is retrieved and displayed. The code is used by the payment enabler to reference the electronic gift chosen by the sender 110. In some embodiments, the code may embed details of the electronic gift or other information.

When the sender or receiver 110, 130 works with the electronic gift function, the web interface hands them off to the transfer system 190. The enabler interface 420 facilitates the communication between the eCard site 140 and the transfer system 190 such that the user 110, 130 is provided with a seamless experience. User information is passed by the payment enabler interface 420 to the messaging function 316 of the transfer system 190. Through that same pathway, information on the selected electronic gift is provided to the eCard site 140.

Figure 5:
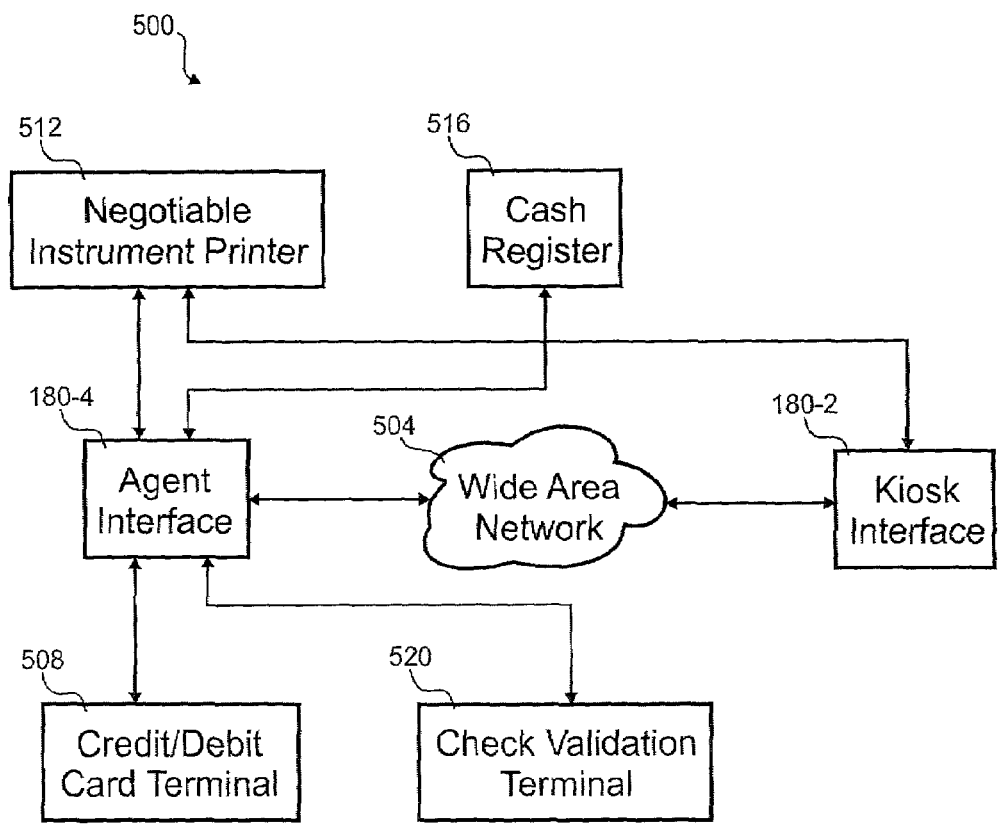
FIG. 5 is a block diagram of an embodiment of an agent location.

Referring to FIG. 5, a block diagram of an embodiment of an agent location 500 is shown. Both the agent and kiosk interfaces 180-2, 180-4 are coupled to a wide area network 504 that is coupled to the payment enabler 170. The agent location 500 may be used as an agent money handler 160-5 to accept and disperse money in the form of check, money order, cash, gift certificate, etc.

The kiosk interface 180-2 is primarily intended for users to interact with, and the agent interface 180-4 is primarily intended for agents to interact with. In some embodiments, both interfaces 180-2, 180-4 are used to perform a transfer. For example, the agent may use the agent interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user 110, 130 is trained to use the system 100, but does not utilize other interfaces 180 for whatever reason.

eThe agent interface 180-4 and kiosk interface 180-2 can output a negotiable instrument with a printer 512. Examples of negotiable instruments include money orders, cashiers checks, tellers checks, certified checks, checks, gift certificates, coupons, etc. In some embodiments, each interface 180-2, 180-4 may have a separate printer. The printer 512 may also be used to print receipts and messages related to the transfer of money.

Money can be added to or removed from the system 100 at the agent location 500 with money distribution devices 508, 516, 520. In the conventional manner, cash can be received by the cash register, credit or debit cards and be debited by the card terminal 508, and checks can be confirmed with a check validation terminal 520. Cash can be paid out from the cash register 516 or added to a credit or debit card by the card terminal 508 in a conventional fashion. These money distribution devices 508, 516, 520 all interface with the system 100 by way of the agent interface 180-4 such that pay-outs and pay-ins can be automatically recorded by the payment enabler 170.

Figure 6:
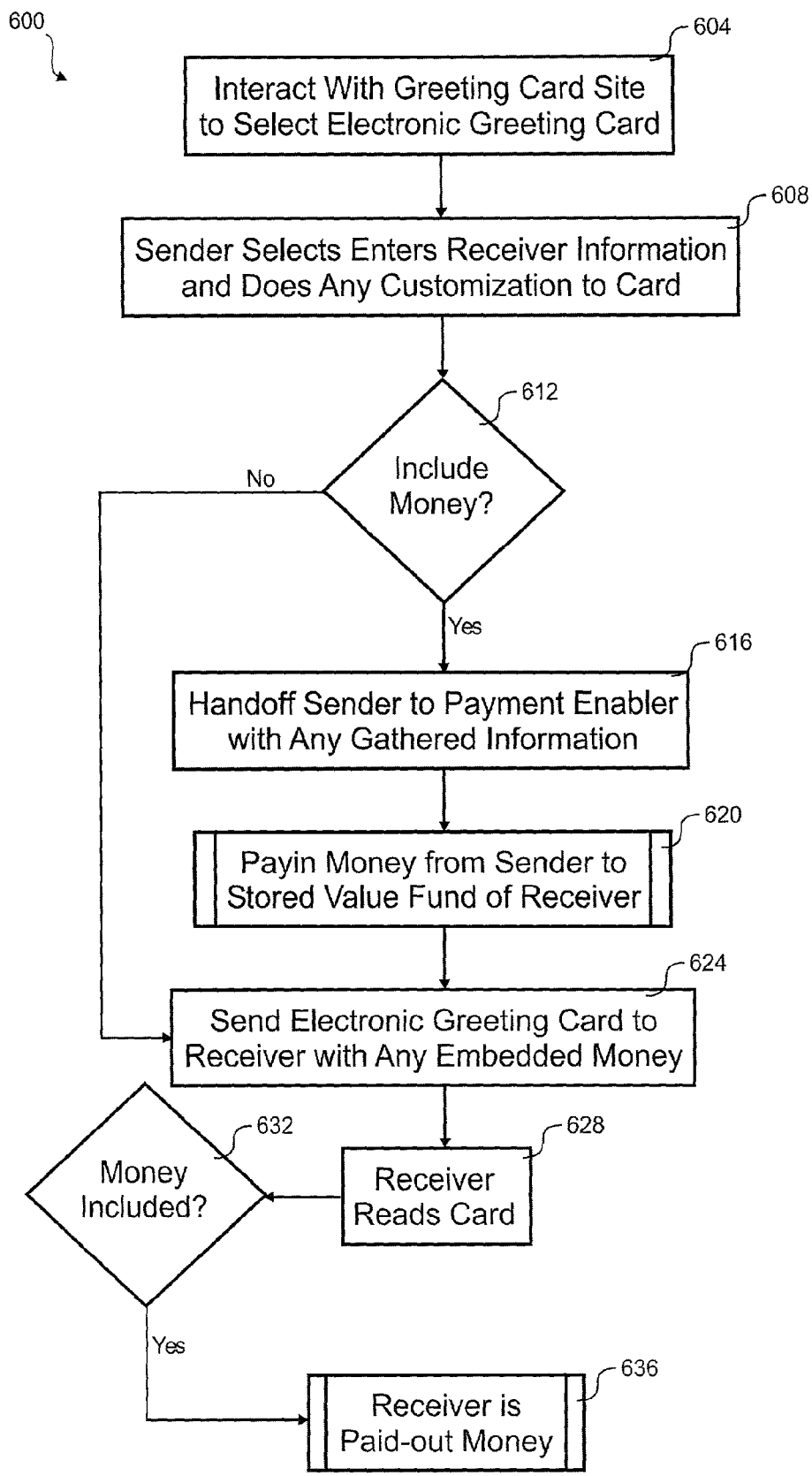
FIG. 6 is a flow diagram of an embodiment of a process for sending an electronic greeting card (eCard) that may include an electronic gift.

With reference to FIG. 6, a flow diagram of an embodiment of a process 600 for sending an eCard that may include an electronic gift is shown. The depicted portion of the process 600 begins in step 604 where the sender 110 interacts with the web interface 408 of the transfer system 190 to select the eCard. In step 608, the sender 110 enters the e-mail address, name, and any customizations to the eCard. These entries are stored in the user database 416. Where there is no electronic gift enclosed, the eCard is sent in step 624 and read in step 628.

Where the sender decides to include an electronic gift in step 612, processing continues to step 616 where the sender 110 is handed-off to the payment enabler 170. Any user information is passed by the payment enabler interface 420 to the messaging function 316 of the payment enabler 170. This information is used to pre-populate any forms presented to the sender or later to the receiver 110, 130. In step 620, the money is paid into the payment enabler 170 to pay for the electronic gift. If more work is required on the eCard, the sender 10 could be passed back to the eCard site 140.

If the eCard creation process is complete, the eCard is sent by e-mail or other electronic methods to the receiver in step 624. In step 628, the receiver 130 opens the email message and clicks on a link in the e-mail to open a browser window directed at the web interface 408 of the eCard site 140. If an electronic gift is included in the eCard as determined in step 632, an icon or button appears in the eCard that is clicked to direct the receiver 130 to a screen that informs the receiver 130 of the gift. This screen could include another message, information on the electronic gift, advertisements, and/or other information. The screen may give all the information necessary for redeeming the electronic gift. For example, another button may be presented entitled "redeem your gift certificate" that would forward the user to the target merchant(s) for the gift certificate. To verify identity, the target merchant would require the e-mail address for the eCard be used to configure an account. Where money is available from a stored value fund on the payment enabler 170, the receiver 130 is invited to create an account where there is none.

Figure 7:
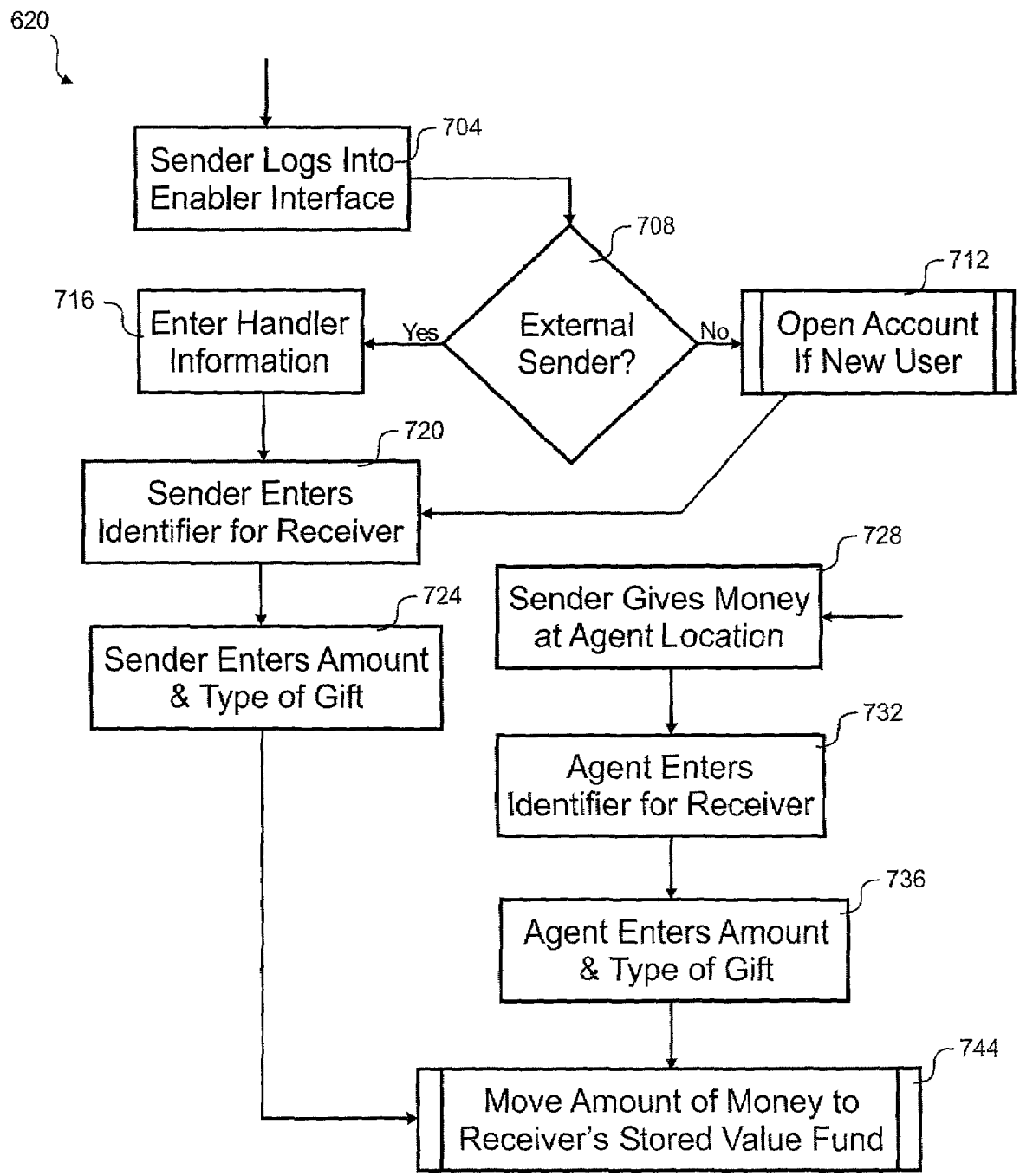
FIG. 7 is a flow diagram of an embodiment of a process for paying-in money to the payment enabler.

Referring to FIG. 7, a flow diagram of an embodiment of a process 620 for paying-in money to the payment enabler 170 is shown. To pay for the electronic gift, money is transferred from a money handler 160 of the sender 110 to a stored value fund 744 of the receiver 130. The stored value fund may be used only once to pay for the present gift or could be used any number of times by the receiver 130. The stored value fund is identified by the e-mail address of the receiver 130, among other ways. If a fund already exists, it may be used for the present transaction. There are two ways in the process 620 to fund the payment enabler 170. The first starts in step 704 and is done through the Internet 150 or other electronic means and the second starts in step 728 and is done at an agent location 500.

Referring initially to the first way, which starts in step 704, the sender 110 logs into the enabler interface 320 after being handed-off from the eCard site 140. In some embodiments, the sender 110 may be automatically logged in based upon information from the eCard site 140. Depending on the situation, the sender may or may not need to open an account with the payment enabler 170. Where the sender doesn't need an account for the electronic gift, the sender is said to remain "external" to the transfer system 190. If an account is required as determined in step 708, an account is opened in step 712 if there is none. For external transactions, money handler information is provided in step 716.

An identifier is entered for the receiver in step 720, although this step could be automatically performed with information from the eCard site. The identifier in this embodiment is the e-mail address of the receiver 130, but other identifiers could also be used in other embodiments. In step 724, the sender is given options for the electronic gifts and the prices associated with each. The prices may include any service fees. The money is moved from the specified money handler 160 to the stored value fund of the receiver in step 744.

The second way for the sender 110 to fund the stored value fund of the receiver begins in step 728 where money is given at an agent location 500. The money can be in the form of a credit/debit card, negotiable instrument, cash, etc. If the eCard were already selected online and stored, the agent could access the eCard to add the electronic gift. More typically, the sender would select the eCard at the kiosk interface 180-2 in the retail location 500. The agent is able to pull up the eCard transaction by the identifier of the receiver 130 or other information in step 732. With the provided money, the agent enters the desired electronic gift and the amount associated with it. In step 744, the money is moved to the receiver's stored value fund minus any fees.

Figure 8:
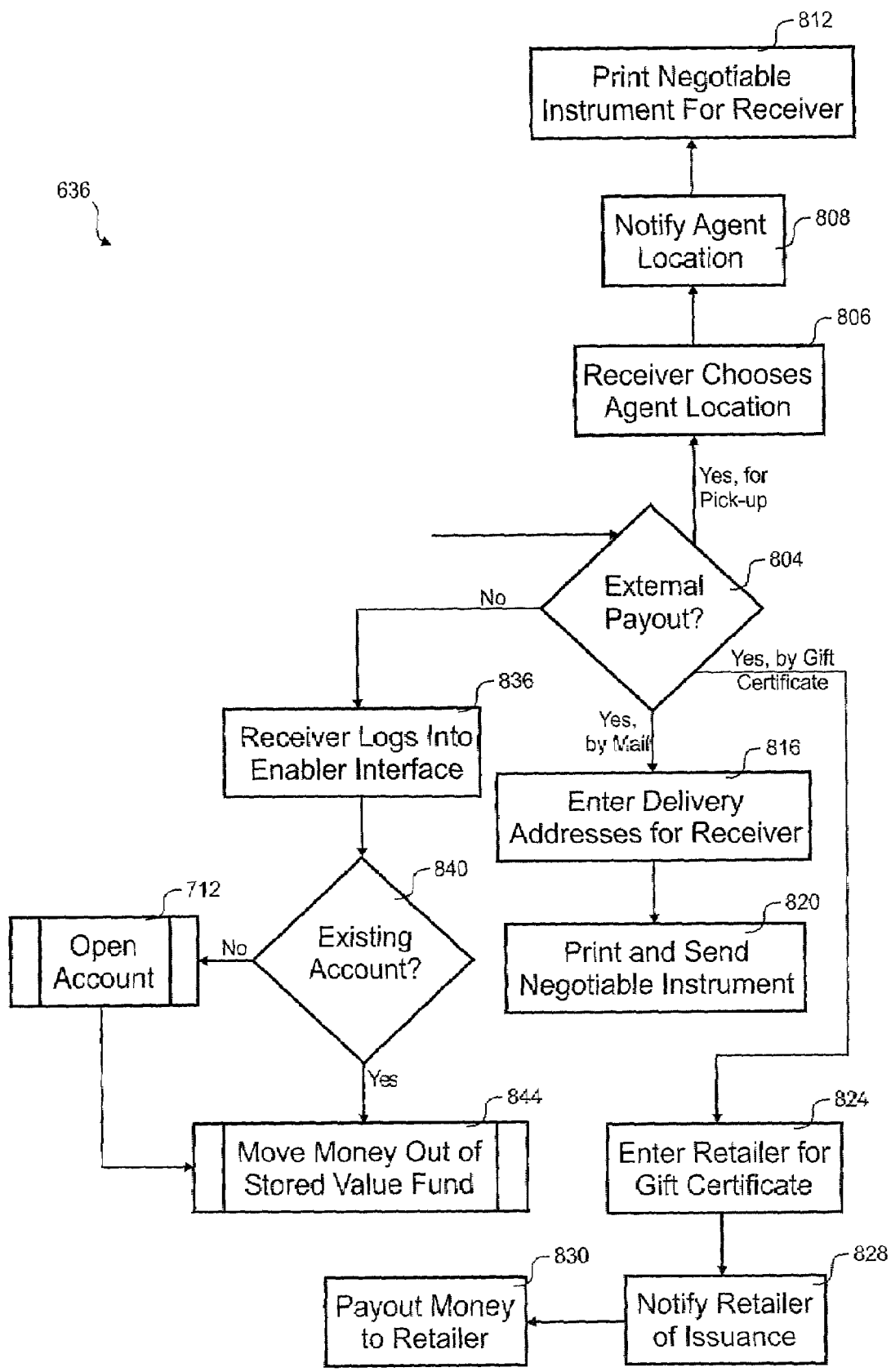
FIG. 8 is a flow diagram of an embodiment of a process for paying-out the electronic gift from the payment enabler.

With reference to FIG. 8, a flow diagram of an embodiment of a process 636 for paying-out the electronic gift from the payment enabler 170 is shown. This embodiment demonstrates four different payout examples: payment of money to the stored value fund of the receiver, printing of a negotiable instrument for pick-up at an agent location 500, printing and delivery of a negotiable instrument to a specified address, and delivery of a gift certificate with a targeted retailer. The first option allows the receiver 130 to choose the money handler 160, while the latter three options are called external payouts where the money handler 160 is specified by the sender. For example, the sender may specify a gift certificate where the money is limited to merchandise or services from specified retailer(s).

In any event, the depicted portion of the process 636 begins in step 804 where the types of external payouts are separated from the internal payout option. Step 806 is the start of the external payout option where a negotiable instrument is provided to an agent location 500. After clicking on the button or icon in the eCard for the electronic gift a screen is presented with information on the electronic gift, or negotiable instrument in this case. That screen or a subsequent screen allows the receiver to find an agent location 500 that is conveniently located for pick-up of the negotiable instrument. In step 808, that agent location is notified of the negotiable instrument and particulars on the receiver. These particulars may include a way to validate the identity of the receiver. For example, a test question and answer could be used to verify identity. In step 812, the negotiable instrument is printed for the receiver 130 after any verification of identity.

The next external payout option involves mailing out a printed negotiable instrument. In step 816, the sender 110 enters the delivery address for the receiver. The payment enabler 170 decides which money handler 160 to use to print the negotiable instrument. That money handler 160 prints and sends the negotiable instrument in step 820.

In the final external payout option depicted, a gift certificate or store credit is forwarded to the target retailer(s) for the benefit of the receiver 130. In some embodiments, he gift certificate could be redeemable at a number of retailers, such that one of those would only get credit if the receiver 130 spent the gift certificate at the one's store. In step 824, the sender 110 enters the target retailer into the payment enabler 170. The retailer is notified of the issuance of the gift certificate in step 828. In step 830, the credit is paid out to the retailer.

With an internal payout, the receiver 130 is given the equivalent of cash that can be used in a number of ways. When the electronic gift screen is opened from the eCard, the receiver 130 is invited to log into the payment enabler interface 420 in step 836. As indicated in step 840, the receiver 130 can log into an existing account or open a new account in step 712. Once an account is logged into or created, the receiver moves the money out of their stored value fund in step 844.

Figure 9:
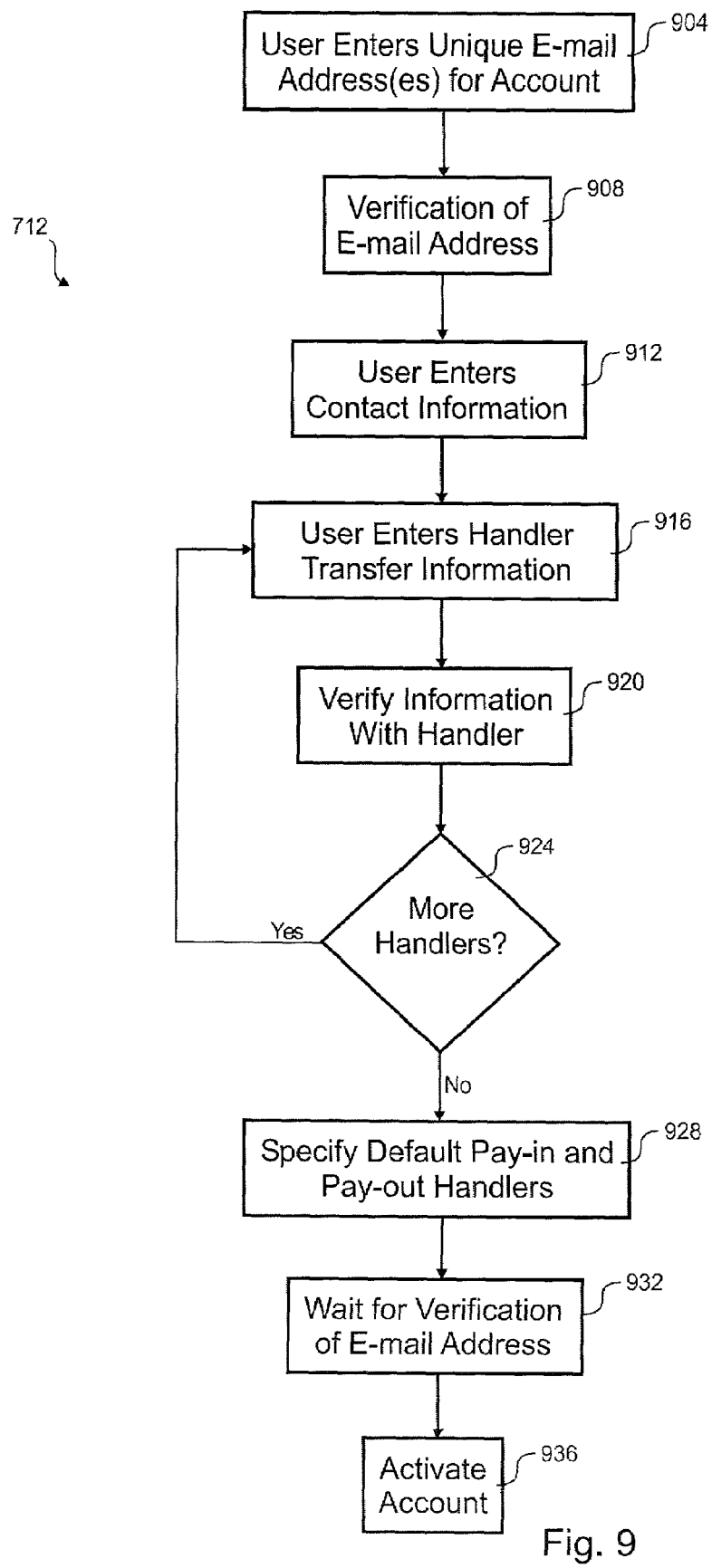
FIG. 9 is a flow diagram of an embodiment of a process for configuring a user with an account for the online money transfer system.

Referring to FIG. 9, a flow diagram of an embodiment of a process 712 for configuring a user with an account for the online money transfer system 190 is shown. Where the receiver 130 or sender 110 is not external to the system, an account with the payment enabler 170 is created. The depicted portion of the process 712 begins in step 904 where the user 110, 130 enters an e-mail address as the unique identifier for the account. The user 110, 130 may want to enter any other e-mail addresses that are aliases of the user and that may be used by counter parties to a transaction. Other embodiments could use any unique identifier for the user 110, 130.

Once an e-mail address is given to the payment enabler 170, it is verified. A message is sent to the e-mail address in step 908. A code is provided and an URL such that the user can click on the URL to load a page where the code is entered to verify the e-mail address. In this embodiment, the code is a randomly generated set of alphanumeric characters. Other embodiments could use any number of methods to verify the e-mail address.

The user 110, 130 enters contact information in step 912. This contact information could include address, phone number, pager address, instant message address, wireless phone address, contact e-mail address, etc. In step 916, the user enters handler interface information. For example, the user might enter credit card information and bank transfer information. In step 920, the information is verified with the handler 160 to the extent possible for that handler 160. In step 924, the process 512 can loop back to step 916 for entering and verifying additional handlers.

In step 928, a default input handler 160 and a default output handler 160 can be chosen for transferring money into and out of the system 100. These two handlers 160 may be different. In step 932, the payment enabler 170 waits for verification at least one of the e-mail addresses before activating the account for sending and receiving money with that e-mail address in step 936.

Figure 10:
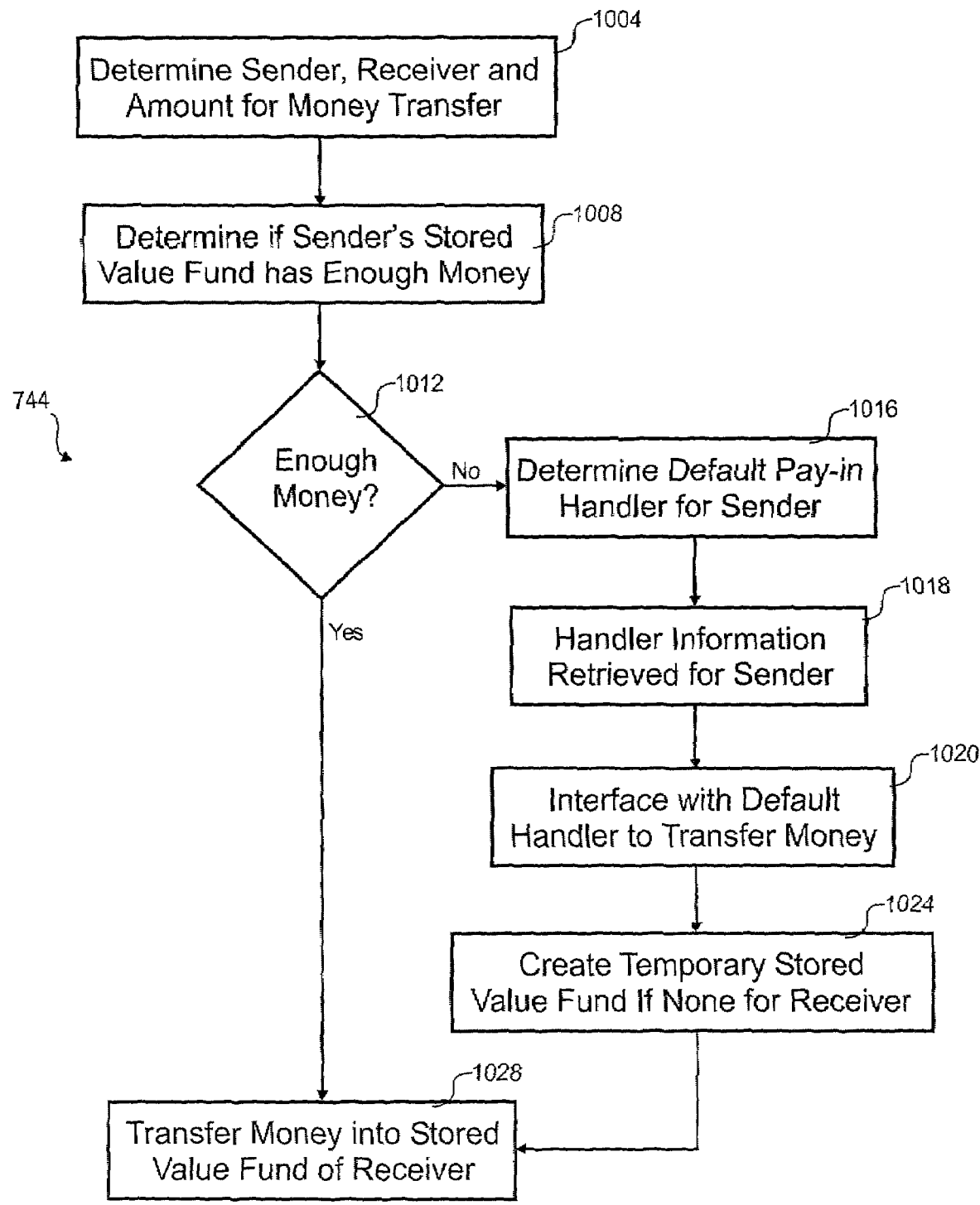
FIG. 10 is a flow diagram of an embodiment of a process for transferring money from the sender to the receiver.

With reference to FIG. 10, a flow diagram of an embodiment of a process 744 for transferring money from the sender 110 to the receiver 130 is shown. The process 744 describes a transfer between a single sender 110 and a single receiver 130, but a number of these processes 536 could be performed in parallel where there are a number of receivers 130. For example, a corporation could distribute eCards with electronic gifts enclosed to a class of employees or clients. The depicted portion of the process begins in step 1004 where the receiver 130, sender 110 and amount are determined for the money transfer. In step 1012, it is determined if the stored value fund of the sender 110 has enough money to fund the transfer to the receiver 130.

Where there is not sufficient funds in the stored value fund, processing continues to step 1016 to load funds. In step 1016, the default pay-in handler 160 is determined. The information used to transfer money from the handler 160 into the payment enabler 170 is retrieved from the user database 324 in step 1018. The sender 110 may be given an opportunity to change the default pay-in handler 160 for this transaction or for all further transactions. Presuming there are no changes, the default handler 160 is interfaced in step 1020 to transfer the money. If there is no stored value fund for the receiver 130, a temporary fund is created in step 1024. A temporary stored value fund can be used for a single transfer, but the receiver may want to make the temporary fund permanent by opening an account with the payment enabler 170.

Regardless of whether new money is added or whether existing money is used, processing continues to step 1028 from both step 1012 and step 1024. In step 1028, the money is attributed to the receivers 130 stored value fund to the detriment of the sender's stored value fund in step 1028. In some embodiments, the payment does not originate in the sender's stored value fund, but passes directly from the money handler 160 of the sender 110 to the stored value fund of the receiver 130. In other embodiments, the sender can select a future time that payment is made such that the payment is configured now, but completed at the future time.

Figure 11A:
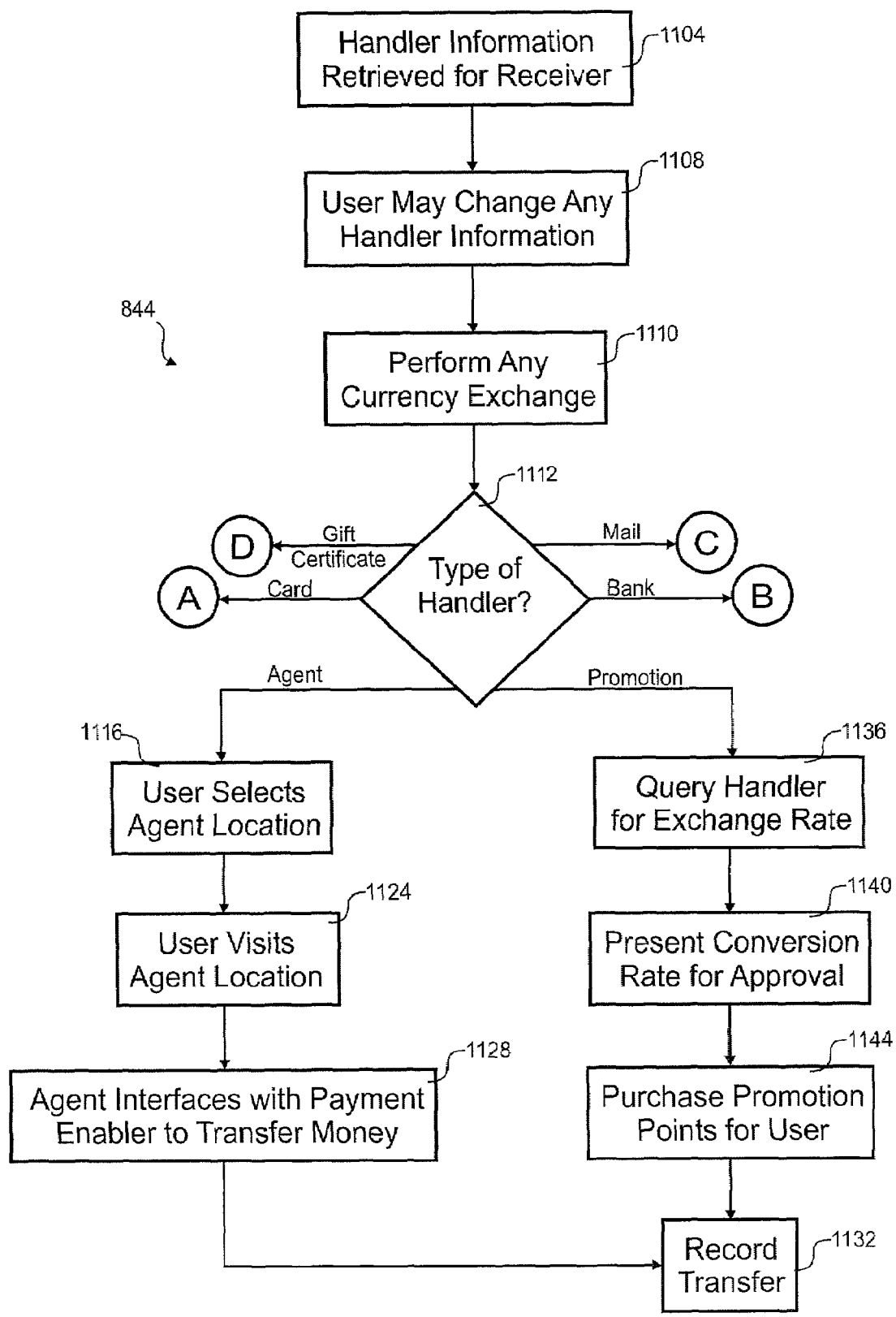
FIGS. 11A and 11B are a flow diagram of an embodiment of a process for moving money out of a stored value fund for a receiver.
Figure 11B:
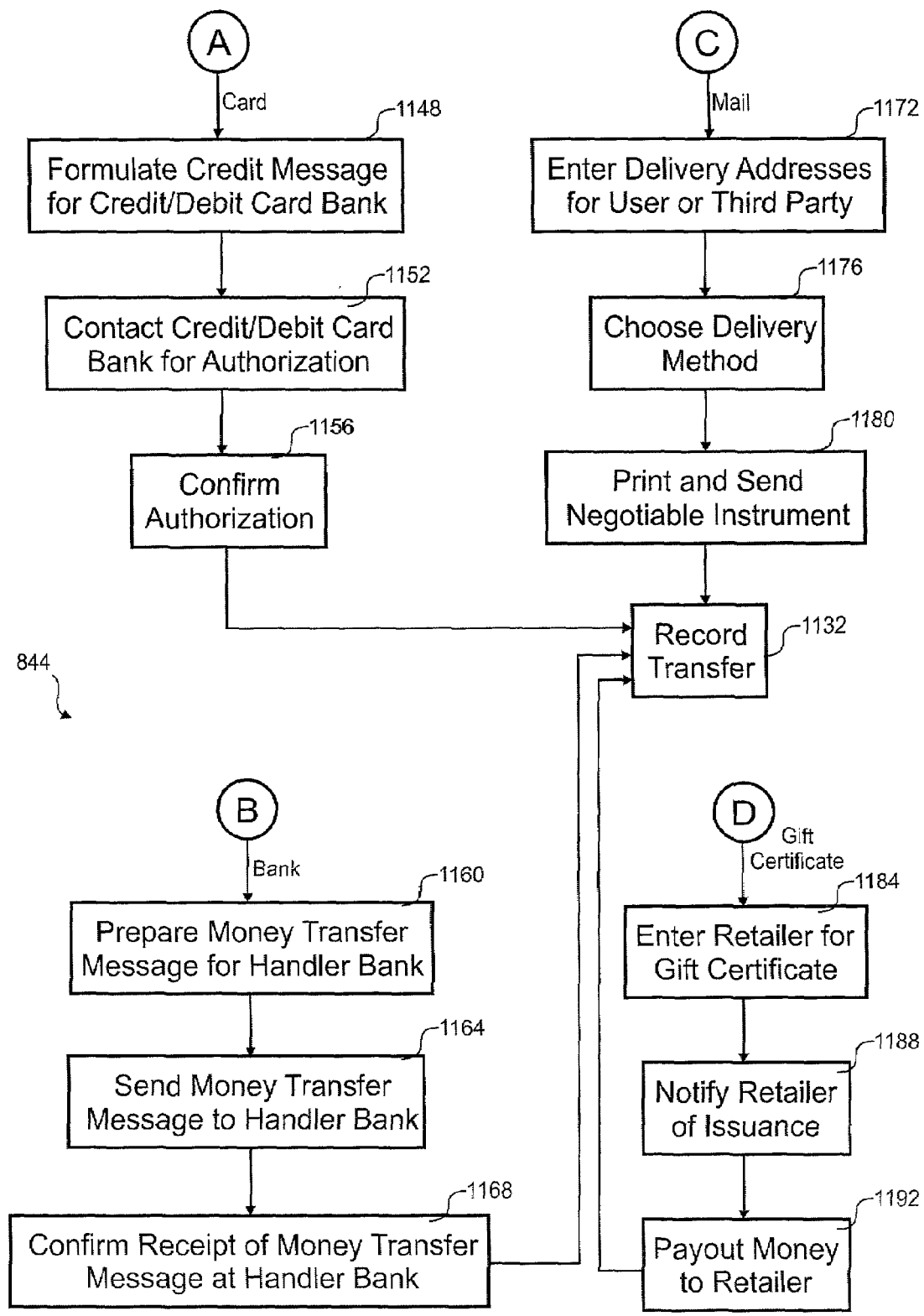

Referring to FIGS. 11A and 11B, a flow diagram of an embodiment of a process 844 for moving money out of a stored value fund for a receiver 130 is shown. This embodiment allows paying-out money in at least six different ways, namely, by: pick-up at an agent location 500, exchanging with some promotion, a credit to a debit or credit card, a credit to a bank account, mailing a negotiable instrument, and sending an electronic gift certificate. The depicted portion of the process 844 begins in step 1104 where the default pay-out handler information is retrieved for the receiver 130. In step 1108, a web page is presented that allows the receiver 130 to select a different handler 160 or to change information for the handler 160.

A user may have a number of different currencies of money in their stored value fund. The user may select some or all of the different currencies for paying out. In many cases, the handler 160 only accepts money in a single currency or the user may simply wish to exchange money to another currency. In step 1110, any currency is exchanged. The exchange rate database 332 is queried for the current rate that is applied by the payment conversion function 328.

In step 1112, processing branches in one of six directions depending on the type of handler the user has chosen. The first two directions are depicted on FIG. 11A and the remainder are depicted on FIG. 11B. One branch beginning in step 1116 corresponds to the user visiting an agent location 500 to transfer out money with the assistance of the agent. In step 1116, the user selects an agent location 500 that is convenient. The user visits the agent location 500 in step 1124 to either use a kiosk interface 180-2 or use the agent. In this embodiment, the user interfaces with the agent who uses the agent interface 180-4 to the payment enabler 170. From the agent interface 180-4, the agent can transfer the money to any handler 160, can print a negotiable instrument or can provide cash to the user. The transfer is recorded by the payment enabler 170 in step 1132.

In another branch that begins in step 1136, a promotion program is chosen as the handler 160-1. Either the promotion handler 160-1 or the exchange rate database 332 can be queried in step 1136 to determine the exchange rate for program credits or points. In step 1140, the conversion rate is presented to the user for approval. Presuming the rate is approved, the promotion credits or points are purchased in step 1144 by interfacing with the promotion handler 160-1. The payout of money to the promotion handler 160-1 is recorded in step 1132.

In yet another branch that begins in step 1148 of FIG. 11B and is labled "A," a credit card or debit card is used to transfer out money from the system 100. In step 1148, a credit message is formulated for the card bank. In some embodiments, the identity of the card holder may be further verified by entry of a PIN or other verification method. The card bank is contacted in step 1152 for authorization of the credit. Authorization of the credit is performed in step 1156. The payout is recorded with the payment enabler 170 in step 1132.

In the branch labeled "B," a bank transfer is used to payout money from the system 100. In step 1160, an EFT message is formulated for the handler bank 160-4. The EFT message is sent to the handler bank 160-4 in step 1164. Receipt of the EFT message is confirmed by the handler interface 308 in step 1168 and the transfer is recorded instep 1132.

In the branch of FIG. 11B labeled "C," a negotiable instrument is printed and sent to the receiver 130 or some other party. In step 1172, the user enters the delivery address and a name to pay the negotiable instrument to. The user can send the negotiable instrument to herself or a third party. A delivery method for sending the negotiable instrument is chosen in step 1176. In step 1180, the negotiable instrument is printed or otherwise produced and sent. The payout is recorded in the user database in step 1132.

In the last branch of FIG. 11B labeled "D," a gift certificate is used to payout the credit in the receivers stored value fund. In step 1184, a retailer(s) is chosen as a target for the gift certificate. The retailer is notified in step 1188. In step 1192, the money is paid-out to the retailer such that a store credit exists for the benefit of the receiver 130 or some other party chosen by the receiver.

While the principles of the invention have been described above in connection with specific apparatuses and methods, it is to be clearly understood that this description is made only by way of example and not as limitation on the scope of the invention.

What is claimed is:

1. A method for creating an electronic greeting card enclosing an electronic gift, the method comprising steps of:
    receiving selection of the electronic greeting card entered by a sender via a first interface comprising an electronic user interface;
    receiving selection of a type of electronic gift from a plurality of gift types;
    receiving payment for the electronic gift from a money handler chosen by the sender, wherein the sender provides the payment at an agent location and the payment is provided through a second interface physically distinct from the first user interface;
    receiving a fee, in addition to and associated with the payment, from the chosen money handler from whom the payment for the electronic gift was received;
    creating a code indicative of the electronic gift, whereby the code facilitates redemption of the electronic gift; and
    embedding the code in the electronic greeting card, wherein the code includes a link to a site that is involved in redemption of the electronic gift.

2. The method for creating the electronic greeting card enclosing the electronic gift as recited in claim 1, further comprising steps of:
    receiving a future time from the sender; and
    sending the electronic greeting card and embedded code to the receiver at the future time.

3. The method for creating the electronic greeting card enclosing the electronic gift as recited in claim 1, further comprising a step of receiving a delivery address for delivery of the electronic gift.

4. The method for creating the electronic greeting card enclosing the electronic gift as recited in claim 1, further comprising steps of:
    receiving first identity verification information from the sender that is used to verify the identity of a receiver of the electronic gift;
    receiving second identity verification information from the receiver; and
    processing the first and second identity information to validate the receiver's identity.

5. The method for creating the electronic greeting card enclosing the electronic gift as recited in claim 1, wherein the plurality of gift types include at least one of: a credit in a stored value fund, a foreign currency credit in the stored value fund, a prepaid credit or debit card, promotional points, or airline mileage credits.

6. The method for creating the electronic greeting card enclosing the electronic gift as recited in claim 1, wherein the code includes a HTML link to one of a target merchant for a gift certificate or the money handler.

7. The method for creating the electronic greeting card enclosing the electronic gift as recited in claim 1, wherein the money handler includes at least one of an agent location, a stored value fund issuer, an airline mileage program issuer, a gift certificate issuer, an electronic gift certificate issuer, or a money order issuer.

8. The method for creating the electronic greeting card enclosing the electronic gift as recited in claim 1, further comprising steps of:
    loading an amount in a stored value fund of the receiver; and
    a step including at least one of the following steps:
    sending the amount to a bank account of the receiver;
    sending the amount to a credit card or a debit card of the receiver;
    sending the amount in a check or a money order to the receiver;
    sending the amount to an agent location chosen by the receiver;
    sending a telegram or a greeting card with a check or a money order to the receiver; or
    sending another electronic greeting card with another electronic gift embedded therewith.

9. The method for creating the electronic greeting card enclosing the electronic gift as recited in claim 1, further comprising a step of receiving selection of:
an amount for the electronic gift, and
an identifier for a receiver of the electronic gift, wherein the identifier corresponds to a stored value fund of the receiver.

10. The method for creating the electronic greeting card enclosing the electronic gift as recited in claim 1, wherein the first-listed receiving step is performed at an electronic greeting card site separate from a payment enabler site that performs the third-listed receiving step.

11. The method for creating the electronic greeting card enclosing the electronic gift as recited in claim 1, wherein the plurality of gift types include at least two of a credit in a stored value fund, a foreign currency credit in the stored value fund, a prepaid credit or debit card, promotional points, or airline mileage credits.

12. The method for creating the electronic greeting card enclosing the electronic gift as recited in claim 1, wherein:
the first interface comprises a kiosk interface at an agent location; and
the second interface comprises an agent interface at an agent location.

13. The method for creating the electronic greeting card enclosing the electronic gift as recited in claim 1, wherein:
the first interface comprises an internet interface; and
the second interface comprises an electronic user interface at an agent location.

14. The method for creating the electronic greeting card enclosing the electronic gift as recited in claim 1, wherein:
the first interface comprises at least one of a kiosk interface, an ATM interface, or an internet interface; and
the sender provides the payment to an agent at the agent location, the payment comprising payment via a credit card, a debit card, a negotiable instrument, or cash; and
the agent interacts with the second interface comprising an agent interface to process the provided payment.

15. A method for generating an electronic gift for enclosing in an electronic greeting card selected by a sender, the method comprising:
receiving selection of the electronic greeting card entered by the sender via a first interface comprising an electronic user interface;
receiving selection of a type of electronic gift from a plurality of electronic gift types, wherein the gift includes a monetary credit in a stored value fund from which money may be withdrawn by a receiver;
receiving payment for the electronic gift from a money handler chosen by the sender wherein the sender provides the payment at an agent location and the payment is provided through a second interface physically distinct from the first user interface;
receiving a fee, in addition to and associated with the payment, from the chosen money handler from whom the payment for the electronic gift was received;
creating a code indicative of the electronic gift, wherein the code includes a link to the on-line site, whereby the code facilitates redemption of the electronic gift; and
providing the code of the electronic gift for embedding in the electronic greeting card.

16. The method for generating the electronic gift for enclosing in the electronic greeting card selected by the sender as recited in claim 15, further comprising steps of:
receiving a future time from the sender; and
sending the electronic greeting card and embedded electronic gift to the receiver at the future time.

17. The method for generating the electronic gift for enclosing in the electronic greeting card selected by the sender as recited in claim 15, further comprising steps of:
receiving first identity verification information from the sender that is used to verify the identity of a receiver of the electronic gift;
receiving second identity verification information from the receiver; and processing the first and second identity information to validate the receivers's identity.

18. The method for generating the electronic gift for enclosing in the electronic greeting card selected by the sender as recited in claim 15, wherein the plurality of gift types include at least one of: a credit in a stored value fund, a foreign currency credit in the stored value fund, a prepaid credit or debit card, promotional points, or airline mileage credits.

19. The method for generating the electronic gift for enclosing in the electronic greeting card selected by the sender as recited in claim 15, wherein the code includes a HTML link to one of a target merchant for a gift certificate or the money handler.

20. The method for generating the electronic gift for enclosing in the electronic greeting card selected by the sender as recited in claim 15, wherein the money handler includes at least one of an agent location, a stored value fund issuer, an airline mileage program issuer, a gift certificate issuer, an electronic gift certificate issuer, or a money order issuer.

21. The method for generating the electronic gift for enclosing in the electronic greeting card selected by the sender as recited in claim 15, wherein the plurality of gift types include at least two of a credit in a stored value fund, a foreign currency credit in the stored value fund, a prepaid credit or debit card, promotional points, or airline mileage credits.

22. A gift and greeting system for generating an electronic greeting card with an electronic gift associated therewith, the system comprising:
a first interface comprising an electronic user interface that receives from a sender selection of the electronic greeting card and a type of electronic gift, wherein:
the type is chosen from a plurality of gift types, and
wherein one of the plurality of gift types is a monetary credit in a first stored value fund;
a second interface at an agent location and physically distinct from the first electronic user interface, the second interface configured to receive payment from a sender for a money handler chosen by the sender;
a payment enabler for receiving payment for the electronic gift from the chosen money handler; and
a payment enabler for processing a code indicative of the electronic gift, wherein:
the code is embedded in the electronic greeting card,
the code comprises a link to a site that administers the stored value fund,
the monetary credit in the first stored value fund can be used by a receiver of the code with any money handler chosen by the receiver, wherein the money handler is chosen from at least two of the following: an agent location from which money may be withdrawn by the receiver, a second stored value fund from which money may be withdrawn by the receiver, a bank, or a money order issuer; and the money handler chosen by the receiver records redemption of at least a part of the monetary credit, the redemption recorded at the first stored value fund.

23. The gift and greeting system for generating the electronic greeting card with the electronic gift associated therewith as recited in claim 22, wherein the payment function receives a fee from the money handler chosen by the sender.

24. The gift and greeting system for generating the electronic greeting card with the electronic gift associated therewith as recited in claim 22, wherein:
   a future time is received from the sender; and
   the electronic greeting card and embedded electronic gift are sent to the receiver at the future time.

25. The gift and greeting system for generating the electronic greeting card with the electronic gift associated therewith as recited in claim 22, wherein the code indicates the electronic greeting card and the type of electronic gift.

26. The gift and greeting system for generating the electronic greeting card with the electronic gift associated therewith as recited in claim 22, wherein the code is embedded in a uniform resource locator for the electronic greeting card.

27. The gift and greeting system for generating the electronic greeting card with the electronic gift associated therewith as recited in claim 22, wherein the plurality of gift types include at least two of a credit in a stored value fund, a foreign currency credit in the stored value fund, a prepaid credit or debit card, promotional points, or airline mileage credits.

28. The gift and greeting system for generating the electronic greeting card with the electronic gift associated therewith as recited in claim 22, wherein the first interface is linked to an electronic greeting card site separate from a payment enabler site that includes the redemption function.

* * * * *

UNITED STATES PATENT AND TRADEMARK OFFICE
CERTIFICATE OF CORRECTION

| | |
|---|---|
| PATENT NO. | : 7,266,533 B2 |
| APPLICATION NO. | : 10/010068 |
| DATED | : September 4, 2007 |
| INVENTOR(S) | : Peter M. Karas et al. |

It is certified that error appears in the above-identified patent and that said Letters Patent is hereby corrected as shown below:

At Column 7, line 40, "10" should be -- 110 --.
At Column 11 line 36, "instep" should be -- in step --.
Claim 17 at column 14, line 11, "receivers's" should be -- receiver's --.

Signed and Sealed this

Sixth Day of November, 2007

JON W. DUDAS
*Director of the United States Patent and Trademark Office*